(12) United States Patent
Linden et al.

(10) Patent No.: US 8,392,496 B2
(45) Date of Patent: Mar. 5, 2013

(54) CLUSTER ARCHITECTURE FOR NETWORK SECURITY PROCESSING

(75) Inventors: Thomas Linden, Los Gatos, CA (US); James Huang, Irvine, CA (US); Jeff Hsu, San Jose, CA (US); Ming-Jeng Lee, Irvine, CA (US)

(73) Assignee: Watchguard Technologies, Inc., Seattle, WA (US)

( * ) Notice: Subject to any disclaimer, the term of this patent is extended or adjusted under 35 U.S.C. 154(b) by 277 days.

(21) Appl. No.: 12/643,663

(22) Filed: Dec. 21, 2009

(65) Prior Publication Data

US 2010/0162383 A1 Jun. 24, 2010

Related U.S. Application Data

(60) Provisional application No. 61/139,078, filed on Dec. 19, 2008.

(51) Int. Cl.
*G06F 15/16* (2006.01)
(52) U.S. Cl. ........ 709/201; 709/200; 709/207; 370/409; 370/410
(58) Field of Classification Search .................. 709/200, 709/201, 207; 370/409, 410
See application file for complete search history.

(56) References Cited

U.S. PATENT DOCUMENTS

| | | | | |
|---|---|---|---|---|
| 5,963,746 | A * | 10/1999 | Barker et al. | 712/20 |
| 6,266,335 | B1 * | 7/2001 | Bhaskaran | 370/399 |
| 6,636,520 | B1 * | 10/2003 | Jason et al. | 370/401 |
| 6,665,304 | B2 | 12/2003 | Beck et al. | |
| 6,880,089 | B1 * | 4/2005 | Bommareddy et al. | 726/11 |
| 7,055,173 | B1 * | 5/2006 | Chaganty et al. | 726/11 |
| 7,152,185 | B2 * | 12/2006 | Srivastava et al. | 714/24 |
| 7,260,518 | B2 | 8/2007 | Kerr et al. | |
| 7,689,694 | B2 * | 3/2010 | Kato et al. | 709/226 |
| 7,814,218 | B1 * | 10/2010 | Knee et al. | 709/230 |
| 2003/0046394 | A1 * | 3/2003 | Goddard et al. | 709/226 |
| 2004/0073603 | A1 * | 4/2004 | Ellis, III | 709/201 |
| 2006/0100912 | A1 * | 5/2006 | Kumar et al. | 705/4 |
| 2009/0040926 | A1 * | 2/2009 | Li et al. | 370/230.1 |
| 2009/0092043 | A1 * | 4/2009 | Lapuh et al. | 370/228 |

FOREIGN PATENT DOCUMENTS

| | | |
|---|---|---|
| EP | 1048145 B1 | 6/2007 |
| WO | WO9933227 | 7/1999 |

\* cited by examiner

*Primary Examiner* — Tesfay Yohannes
(74) *Attorney, Agent, or Firm* — Kory D. Christensen; Stoel Rives LLP

(57) ABSTRACT

A computing device may be joined to a cluster by discovering the device, determining whether the device is eligible to join the cluster, configuring the device, and assigning the device a cluster role. A device may be assigned to act as a cluster master, backup master, active device, standby device, or another role. The cluster master may be configured to assign tasks, such as network flow processing to the cluster devices. The cluster master and backup master may maintain global, run-time synchronization data pertaining to each of the network flows, shared resources, cluster configuration, and the like. The devices within the cluster may monitor one another. Monitoring may include transmitting status messages comprising indicators of device health to the other devices in the cluster. In the event a device satisfies failover conditions, a failover operation to replace the device with another standby device, may be performed.

43 Claims, 18 Drawing Sheets

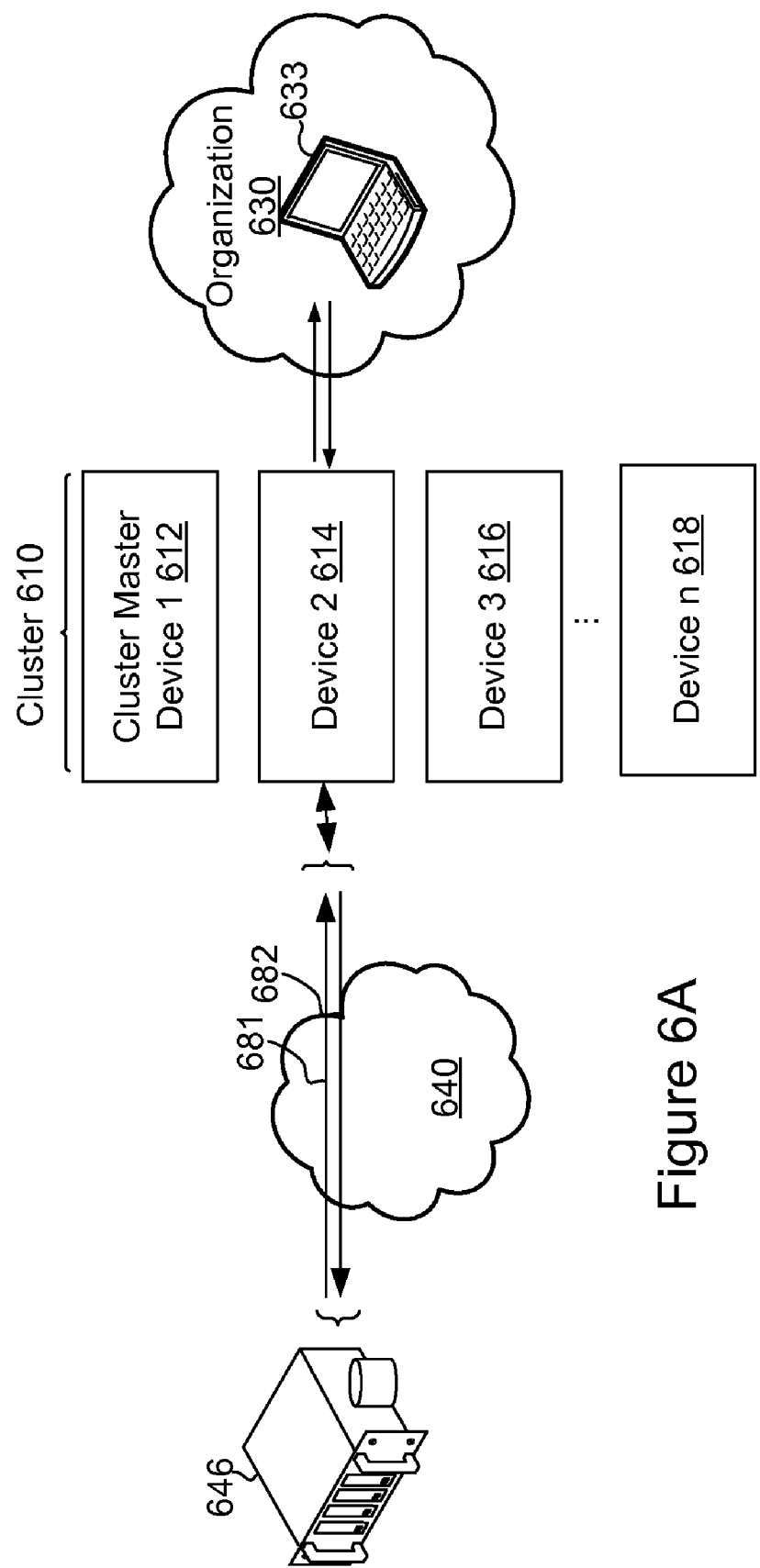

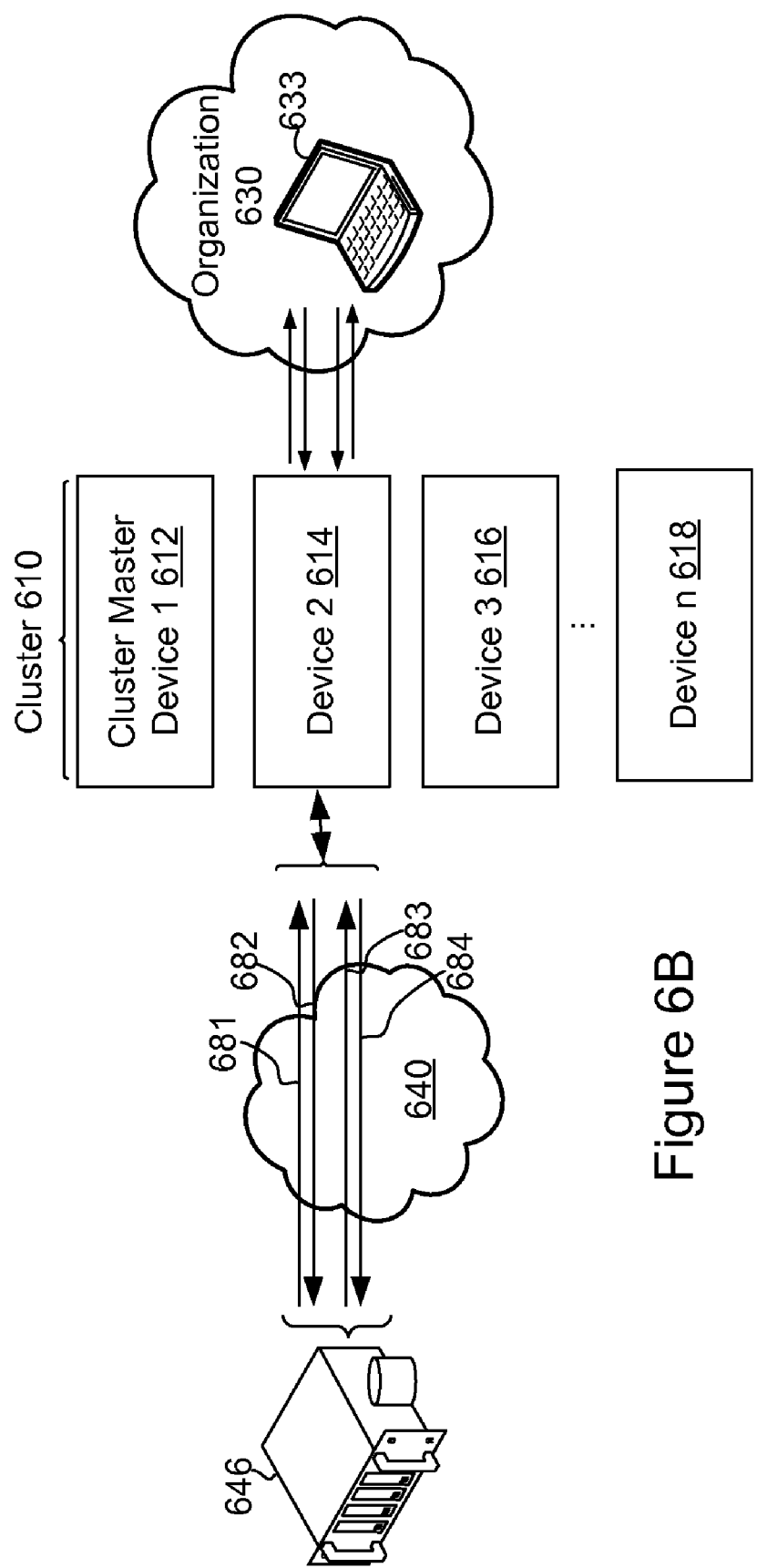

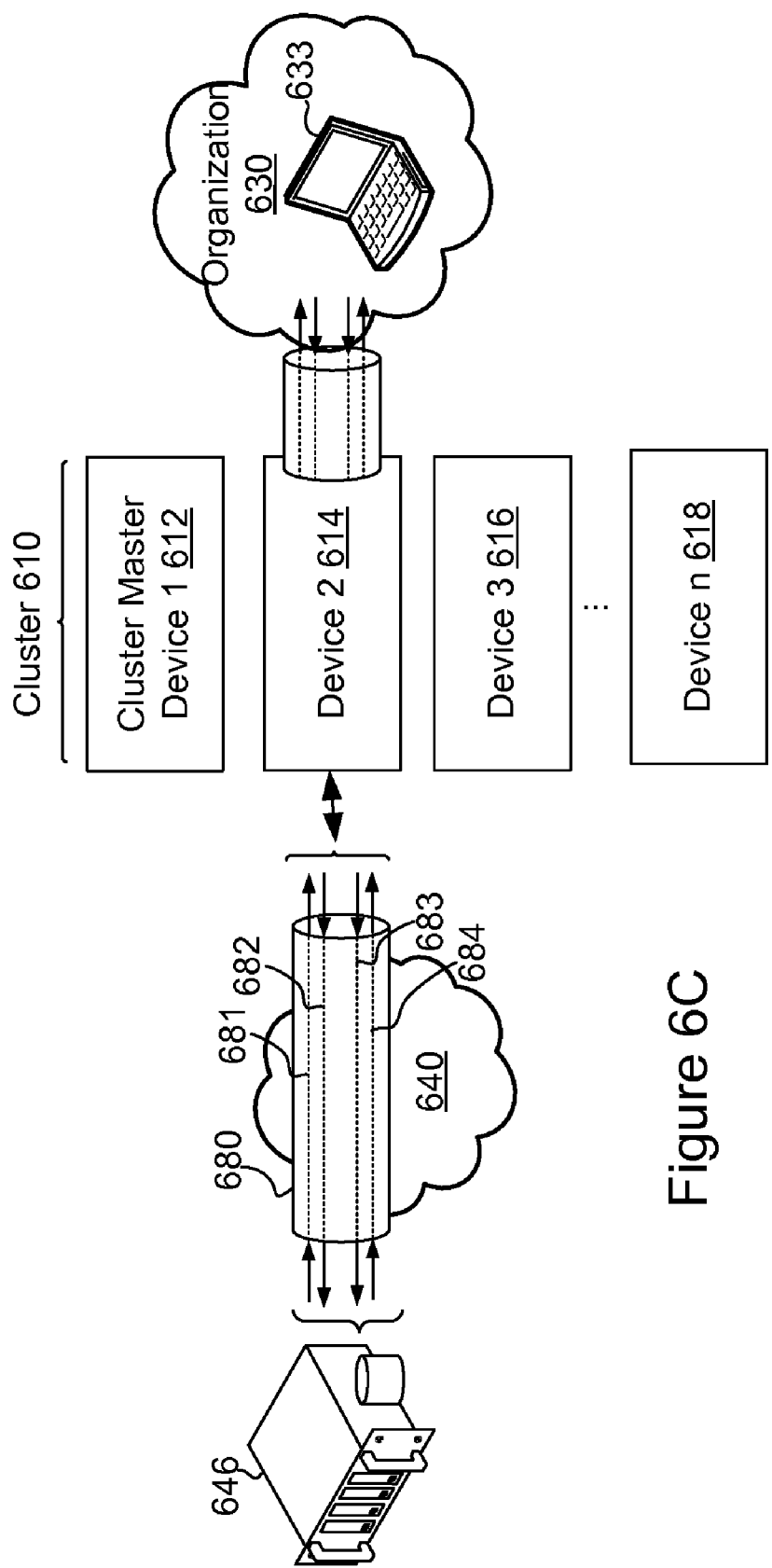

CLUSTER ARCHITECTURE FOR NETWORK SECURITY PROCESSING

CROSS-REFERENCE TO RELATED APPLICATIONS

This application claims priority to U.S. Provisional Application No. 61/139,078, filed Dec. 19, 2008, and entitled, "Clustered Architecture for Network Security Devices," which is hereby incorporated by reference in its entirety.

TECHNICAL FIELD

This disclosure relates to network services and, in particular, to formation of a cluster comprising two or more computing devices configured to provide network services.

BRIEF DESCRIPTION OF THE DRAWINGS

Additional aspects and advantages will be apparent from the following detailed description of preferred embodiments, which proceeds with reference to the accompanying drawings.

FIG. 6A is a block diagram depicting one example of related flow assignment, in which related forward and reverse flows are assigned to the same cluster device;

FIG. 6B is a block diagram depicting another example of related flow assignment, in which related flows are assigned to the same cluster device;

FIG. 6C is a block diagram depicting an example of security flow assignment, in which flows associated with the same tunnel are assigned to the same cluster device;

DETAILED DESCRIPTION OF PREFERRED EMBODIMENTS

Figure 1:
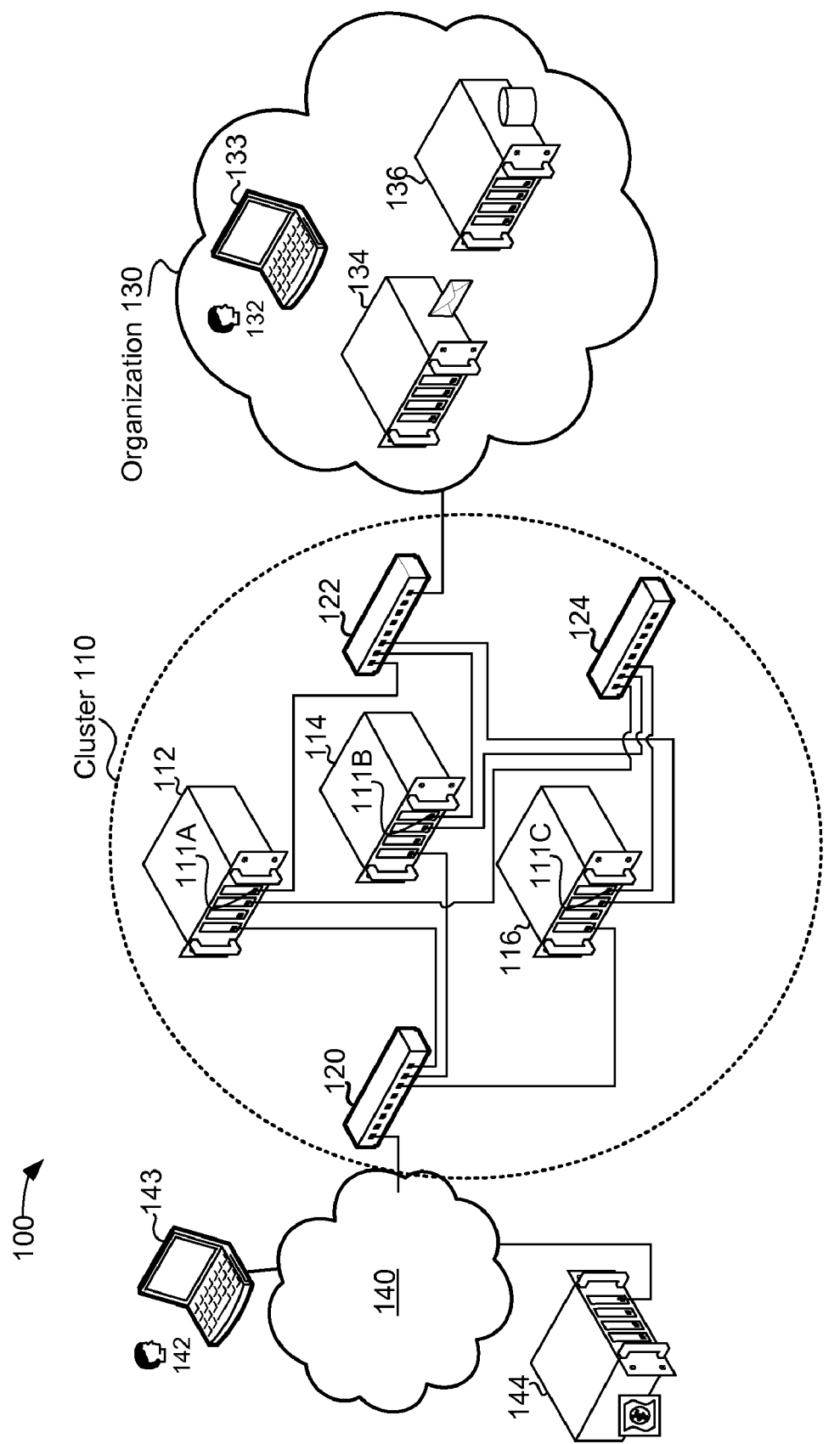
FIG. 1 is a block diagram of one embodiment of a cluster.

As used herein, a clustered computing system or "cluster" may refer to two or more computing devices configured to cooperatively perform a task. In some embodiments, a cluster may be formed of a plurality of computing devices of the same type (e.g., a homogeneous cluster). Alternatively, a cluster may comprise computing devices of different types and/or configurations (e.g., a heterogeneous cluster).

A cluster may be configured to provide network communications and security services including, but not limited to: providing firewall services, acting as a forward and/or reverse proxy, virtual private networking (VPN), packet filtering, anti-virus services, Internet Provider Security (IPS), tunneling, Spam blocking, Web blocking, and the like.

A cluster may be configured to operate in a "load balancing" or "high throughput" mode. As used herein, "load sharing" or "high throughput" may refer to an operational mode of a cluster in which one or more of the computing devices in the cluster are configured to work together to implement one or more tasks or services. For example, a highly complex computational task may be split up into a plurality of different parts, each of which may be performed by a different computing device in the cluster. Alternatively, or in addition, a set of tasks may be distributed to a plurality of different computing devices in the cluster (e.g., each of a plurality of different VPN connections may be serviced by different members of the cluster). Since the load represented by the task(s) or service(s) may be shared among the computing devices in the cluster, the cluster may be capable of performing certain task(s) and/or providing certain service(s) more efficiently than a single computing device.

One or more of the computing devices in a cluster may be configured to operate in "high availability mode." In high availability mode, one or more of the computing devices in the cluster may be in "active" or "primary" mode, while other computing devices in the cluster are in "standby" or "secondary" mode. The devices in active mode may be configured to perform the task(s) and/or provide the service(s) implemented by the cluster. The devices may have a "static" and "working" role. The static role may be the role of the device as defined in the device-specific cluster configuration thereof, defined by a license (or lack thereof) of the device, defined by a cluster configuration, or the like. The working role may be the current operating state or role of the device as necessitated by the operating conditions of the cluster. A device may have a static role of "active" or "primary," meaning that the device has its own license and may actively process and pass network traffic. A member having a static role of "standby" or "secondary" may not have a license and may not actively process and/or pass network traffic, but operate as a backup to the other cluster device (e.g., when an active device fails over, a standby device may be activated to take its place).

The working role of the cluster devices may include devices that are "active," and "standby." Active devices include the primary devices (that are currently running), and any secondary devices that have been activated to process and/or pass network traffic in place of failed over primary members. Accordingly, a cluster device operating in standby mode may not perform the task(s) and/or provide the service(s) implemented by the cluster. A cluster device operating in standby mode may become "activated" responsive to a failure of one or more of the active computing devices. When activated, the device may implement the task(s) and/or service(s) that were formerly provided by the failed over device, which may prevent an interruption of cluster services (e.g., allow the cluster to provide "high availability" services).

In some embodiments, one of the computing devices in a cluster may operate as a "cluster master." The cluster master may manage the configuration of the cluster, assign processing tasks to the cluster members (e.g., assign network flows to cluster devices), maintain cluster state information (e.g., flow assignment table, security information, etc.), manage shared resources (e.g., outbound traffic addresses, Destination Network Address Translation (DNAT) tables, etc.), synchronize global, run-time synchronization data with a backup master, manage device failover, and the like.

Another one of the computing devices in the cluster may operate as a "backup master," which may be configured to backup the data used by the cluster master. Accordingly, when the cluster master fails over (due to a device failure, upgrade, maintenance, or the like), the backup master may replace the cluster master with minimal service disruption (e.g., may transition into the role of cluster master). When the backup master is promoted to cluster master, another one of the cluster members may be selected as a new backup master. The cluster master may be configured to synchronize global, run-time synchronization data with the backup master. The global, run-time synchronization data may include the data needed by the backup master to begin operating as the cluster master (e.g., cluster configuration, cluster state, and the like).

FIG. 1 is a block diagram of one example of a system comprising a cluster of communicatively coupled computing devices. The cluster 110 of FIG. 1 may be configured to provide the network communications and security services described above (e.g., firewall, packet filtering, VPN, and so on).

In the FIG. 1 example, the cluster 110 comprises three computing devices 112, 114, and 116. However, the disclosure is not limited in this regard, and the cluster 110 could be configured to include any number of computing devices.

The cluster 110 is configured to communicatively couple an organization 130 to a network 140. The network 140 may comprise a set of interconnected networks that implement one or more standard communications protocols (e.g., the Internet Protocol Suite, TCP/IP, or the like). Accordingly, the network 130 may comprise a collection of network infrastructures including, but not limited to: Ethernet networks, wireless networks, Public Switched Telephone networks (PSTN), Home networks, Wi-Fi networks, and the like.

The cluster 110 may include a network interface 120 to communicatively couple the cluster 110 (and the organization 130) with the network 140. The cluster interface 120 may be shared among the computing devices 112, 114, and 116, in the cluster 110. Accordingly, the cluster 110 may appear as a single device to the network 130. In some embodiments, an additional communications interface 122 (organization interface 122) may be provided for communication with the organization 130. The network interface 120 and organization interface 122 may be implemented using respective traffic switches (or different ports of the same traffic switch), or using other network devices (e.g., hubs, routers, switches, or the like). Accordingly, network traffic between the organization 130 and the network 140 may pass through the cluster 110, which may, therefore, provide network security services to the organization, including, but not limited to: firewall, packet filtering, Spam filtering, Web filtering, and so on. In addition, the cluster 110 may provide for secure access to services within the organization 130 by entities within the network 140 (e.g., provide VPN services). For example, a VPN may allow an entity 142 communicatively coupled to the network 140 using a computing device 143 (e.g., personal computer, laptop computer, notebook computer, or the like), to access a mail server 134 and/or file server 136 within the organization 130.

The computing devices 112, 114, and 116 in the cluster 110 may also be communicatively coupled to one another. In some embodiments, the devices 112, 114, and 116 may each be communicatively coupled using respective, dedicated cluster interface ports 111A, 111B, and 111C. The cluster interface ports 111A, 111B, and 111C may be concentrated in cluster network interface 124, which may be comprise one or more routers, switches, concentrators, hubs, or the like.

The devices 112, 114, and 116 may communicate cluster-specific information (discussed below) using the cluster interface port 111A, 111B, and 111C (via the cluster interface 124). In some embodiments, the devices 112, 114, and 116 may be configured to implement a cluster-specific protocol on the cluster interface ports 111A, 111B, and 111C. The cluster-specific protocol may provide for fast and reliable communication of cluster-specific data, including, but not limited to: cluster state information, service information, device health information, failover, synchronization data, and the like. In some embodiments, the cluster-specific protocol may be implemented within the data-link layer (of the eight layer Open System Interconnection Reference Model ("OSI model")), as opposed to the application layer (or another, higher layer), to allow the cluster interface port to continue to operate regardless of faults in the application layer of the device 112, 114, and/or 116.

The cluster 110 may be formed by designating one of the computing devices 112, 114, or 116 to act as a cluster master. In the FIG. 1 example, computing device 112 may be selected as the cluster master (e.g., by personnel or the organization, IT staff, or the like). Designing a cluster master may comprise providing the computing device 112 with a cluster configuration, which may define the tasks and/or services to be provided by the cluster 110. For example, a cluster configuration may determine the security services to be provided by the cluster 110 (e.g., packet filtering, VPN, etc.), define the security policy to be implemented by the cluster 110, and so on. Configuring the cluster master may further comprise setting a "cluster enabled" flag on the designated computing device 112, setting a cluster identifier (e.g., cluster name), designating one or more ports for cluster communication (e.g., cluster interface port 111A), and so on. When the computing device 112 is so configured, the cluster 110 may be created (a cluster 110 comprising a single computing device 111), and the computing device 112 may begin acting as a cluster master.

Additional computing devices (e.g., devices 114 and 116) may be added to the cluster 110 by connecting the device(s) to the cluster interface 124, the network interface 120 and/or the organization interface 122. The cluster master 112 (and/or other devices added to the cluster), may be configured to detect the connection of a new computing device to the cluster 110 (e.g., to the cluster interface 124, network interface 120, and/or the organization interface 122). In some embodiments, the computing devices in the cluster 110 (e.g., the cluster master computing device 112) may transmit periodic discovery messages via their respective cluster interface ports (e.g., cluster interface port 111A of the computing device 112). The discovery messages may comprise broadcast-type messages configured to be received by any computing device (114 and/or 116) communicatively coupled to the cluster interface 124 (or other interface 120 and/or 122).

Once discovered, the new computing device 114 may receive a device-specific configuration from one of the other devices in the cluster 110. The device-specific configuration may configure the new computing device 114 to operate in "cluster" mode, configure the cluster interface port of the device (port 111B, discussed below), assign a role to the device (e.g., active, standby, or the like), and so on.

After receiving the device-specific cluster configuration, the new device 114 may join the cluster (e.g., begin communicating via the cluster interface port 111B), and receive a cluster configuration from another cluster device. The cluster configuration may include a definition of the services provided by the cluster 110 (e.g., VPN, firewall, packet filtering, etc.), define a security policy implemented by the cluster 110, define cluster capabilities (e.g., maximum number of simultaneous connections, etc.), and the like. The new device 114 may receive and implement the device-specific configuration (and cluster configuration).

The cluster master (or other cluster device 112, 114, and/or 116) may verify that the device has successfully implemented the device-specific configuration (including the cluster configuration). After the verification, the new computing device may be joined to the cluster. Joining the cluster 110 may comprise establishing and/or joining a secure cluster communications channel, which may comprise providing the new device with a shared key, performing a key exchange protocol, or the like. The secure connection may be established on the cluster interface port of the device (e.g., port 111A, 111B, or 111C). The secure cluster connection may be used to synchronize cluster configuration data, flow, run-time synchronization data, global, run-time synchronization data, security services data, time, device monitoring information (e.g., device status messages, health scores, etc), provide access to shared resources (e.g., address pools, port pools, and so on), provide access to shared services (e.g., a shared Internet Key Exchange (IKE) module), and the like.

As discussed above, a cluster 110 may include "active" members operating in "high throughput" mode as well as "standby" member operating in "high availability mode." A cluster configuration may specify that the cluster 110 is to include a particular number of active cluster members (e.g., N active members), with any additional members to operate in standby mode. In another embodiment, a cluster configuration may specify N active members and Y standby cluster members, specify a certain proportion of active to standby cluster members, or the like. As new members are added to the cluster (according to the discovery processes above), the cluster master (or another cluster device) may determine whether the cluster should be configured to operate in active or standby mode.

If the device is to operate in active mode, it may be made available to perform task(s) and/or provide service(s) as directed by the cluster master (according to a load balancing scheme defined by the cluster configuration). If the device is to operate in standby mode, it may not take on active task(s) and/or provide service(s) until another device fails or stops responding.

Figure 2A:
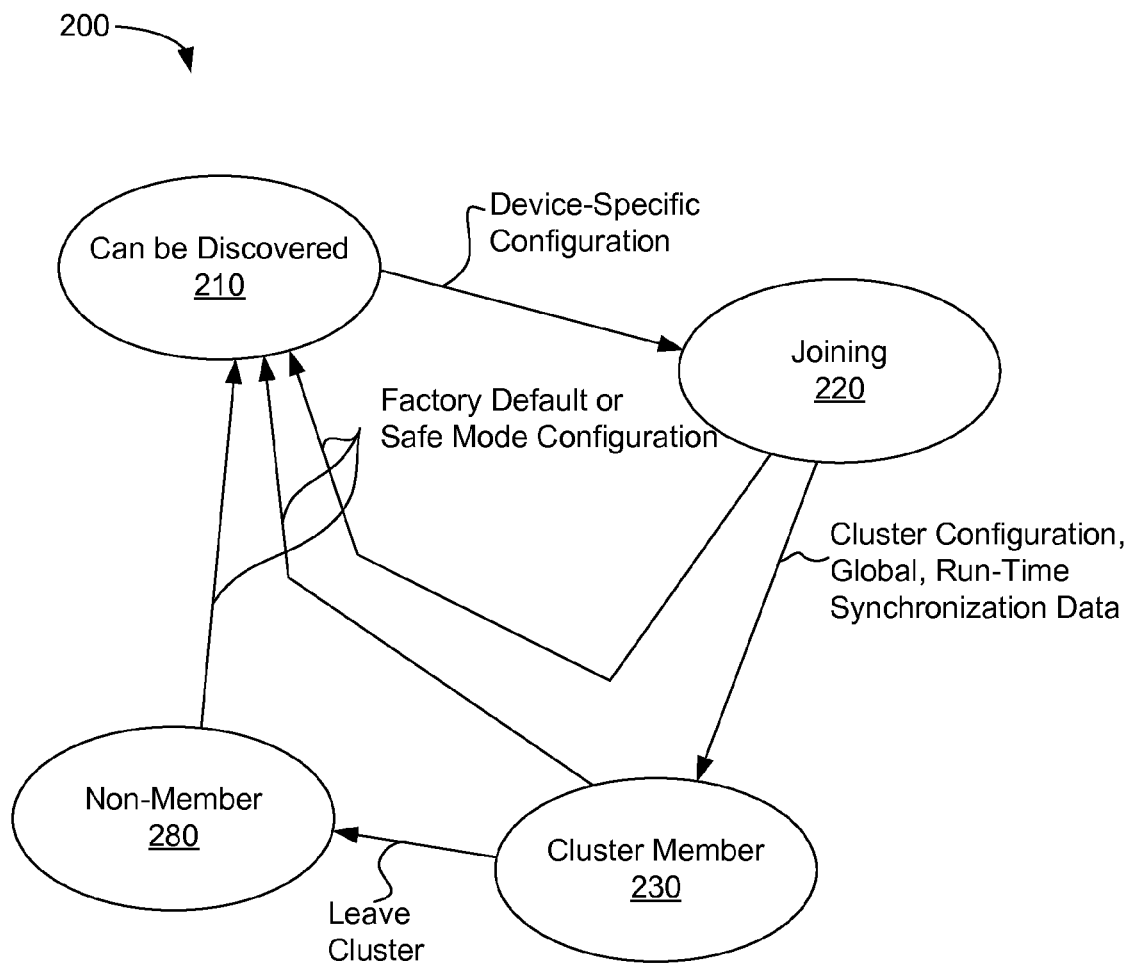
FIG. 2A is a state diagram depicting a method for adding a device to a cluster.

FIG. 2A is a state diagram 200 depicting the addition of a new device to a cluster. The state diagram 200 may be implemented as a method, comprising a plurality of steps (e.g., method 201 discussed below in conjunction with FIG. 2B).

When in state 210, a device may be communicatively connected to a network (e.g., connected to the interfaces 120, 122, and/or 124 of FIG. 1). The new device may be unconfigured (in a default or safe configuration) and, as such, may not yet have joined the cluster (e.g., not configured to communicate with other cluster devices, receive processing tasks, etc.). In state 210, the device may be discoverable by other devices in the cluster. Causing a device to enter state 210 may include physically connecting a communications port of the device to a network device (e.g., switch, router, concentrator, or the like), enabling one or more network switch ports or interfaces (e.g., interfaces of network devices 120, 122, and/or 124), enabling one or more communications interfaces of the device, modifying a network configuration and/or topology to communicatively couple the device to other cluster devices, or the like.

In state 210, the device may be actively or passively discovered by another device. In some embodiments, other cluster devices may be configured to transmit discovery messages within a cluster network (e.g., the cluster master may periodically transmit broadcast messages to a cluster interface, such as the interface 124 of FIG. 1). The discovery messages may include a request for the device to provide device identifying information, such as a device serial number, version, capabilities, licensing information, and the like.

The cluster device(s) may use the information to determine whether the device is eligible to join the cluster (e.g., is compatible with the other devices in the cluster and/or licensed to operate in a clustered environment). If the device is not compatible with the cluster and/or not licensed for clustered operation, the device may transition to a non-member state 280. In the non-member state 280, the device may not participate as a primary (active) and/or secondary (standby) member of the cluster. In addition, the other cluster devices may be configured to exclude the device from secure cluster communications, assignment of cluster processing tasks, and the like.

If the device is compatible with other cluster devices and/or is otherwise eligible to join the cluster, a cluster "join" procedure may be initiated. The join procedure may transition the device into a join state 220. Transitioning to the join state 220 may comprise the cluster device(s) (e.g., the cluster master or other device) transmitting a device specific cluster configuration to the device. The device-specific configuration may be loaded and implemented by the device. Loading and implementing the device-specific configuration causes the device to "join" the cluster and transition to state 220.

When in state 220, the device may be prepared to join the cluster as an active or standby cluster member. The preparation in state 220 may include a cluster device (e.g., cluster master) validating the device-specific configuration, verifying a license of the device, synchronizing cluster configuration and/or run-time data with the device, and the like.

In state 220, if the cluster configuration is not validated (e.g., if the cluster configuration loaded on the device differs from the cluster configuration implemented by the cluster master), the device may be returned to state 210, where the device may be re-discovered and have new device-specific configuration data transmitted thereto (e.g., by the cluster master).

The synchronization performed in state 220 may include transmitting run-time, global cluster configuration data to the device (e.g., from other cluster device and/or the cluster master). The run-time, global cluster configuration data may include data used by the devices in the cluster to process and/or pass network traffic and may include, but is not limited to: flow table information (discussed below), security information (e.g., phase one security association (P1SA), phase two security association (P2SA), session keys, etc.), assigned IP for mobile VPN (MOVPN), user session information, a list of devices in the clusters (along with the static and/or working roles thereof), cluster device status information (e.g., device health, etc.), cluster election information (discussed below), and the like.

The cluster configuration data (synchronized from the cluster master) may be used by the cluster device to process network traffic and/or service network requests when the device is operating in active mode. In some embodiments, synchronization may include establishing a secure cluster communications channel on a particular communication interface (e.g., on a dedicated cluster interface port, such as ports 111A-111C depicted in FIG. 1). As will be discussed below, the cluster synchronization channel may be configured to provide for high-performance data synchronization that is resistant to application-layer failures (e.g., implemented at a low layer of the OSI model). If the synchronization cannot be performed (e.g., the device fails to receive the cluster configuration data, the synchronization channel cannot be established, or the like), the device may transition to the non-member state 280.

The license verification performed in state 220 may include determining whether licensing information of the device is valid (e.g., using a cryptographic technique, such as verifying a digital signature, hash value, or the like). If the device does not have a license and/or has licensing information that cannot be validated, the device may be configured to operate in "standby" mode (e.g., have a static role of "secondary" or standby). When in standby mode, the device may not actively perform cluster processing tasks (e.g., handle network flows). If the device has a license and/or the licensed capabilities of the cluster allow for additional active members, the device may be eligible to be an active member of the cluster (e.g., have a static role of "primary" or active).

The license verification in state 220 may further include determining the licensed capabilities of the cluster. In some embodiments, the licensed capabilities of the cluster may be determined by combining the cluster device licenses. The combination may be made in a number of different ways. In some embodiments, the licenses may be combined in a "least common capabilities" fashion, in which the features supported by the cluster may be determined by the "minimum" set of features provided in each of the device licenses. For example, if the license of a first primary member of the cluster provides for features A, B, and C and the license of a second primary member provides for only features A and B, the cluster comprising the first and second members may only support features A and B. In some embodiments, the licenses may be combined in an "OR"-type operation (or other logical combination) in which the capabilities of the devices are added together (e.g., a cluster comprising a first device licensed to provide features A and B and a second device licensed to provide features B and C may be capable of providing features A, B, and C). Alternatively, or in addition, certain licensing features (e.g., VPN) may require that each device has an enabling license, while others may not (e.g., operate in an "OR" fashion).

At step 220, a static role of the device may be determined. As discussed above, if the device does not have its own license, the device may be assigned to operate in a secondary or standby role, meaning that the device may not act as an active cluster device (e.g., a device capable of accepting tasks from the cluster master), until failover occurs. In addition, if the device does have a license, but that license does not give the device the same capabilities implemented by the cluster and/or the cluster configuration already has its allotted number of primary members (e.g., as determined by the cluster configuration), the device be given a secondary or standby static role.

If the device has sufficient licensing privileges and/or other cluster devices have failed over (been removed from the cluster due to a device failure or the like), the device may be configured to operate in a primary or active role (e.g., as an active part of the cluster).

After verifying the device license, synchronizing cluster configuration data, and the like, the device may transition to state 230, where it may act as a cluster member. If the device is configured as a primary or active cluster device, the device may begin accepting processing tasks from the cluster master (e.g., handling network flows, etc.). If the device is configured as a secondary or standby device, the device may wait until failover operation occurs before it begins accepting tasks from the cluster master.

The device may leave the cluster member state 230 by being deactivated (e.g., by the cluster master, a human operator, or the like), being deactivated for an upgrade operation, by being reset, by being failed over, or the like. If the device is deactivated, it may enter the non-member state 280. If the device is reset, it may enter the discoverable state 210, at which point the device may rejoin the cluster as described above.

When the device is in the non-member state 280 (due to a failure to join the cluster from state 220, being deactivated from the active member state 230, or the like), the device may not operate as a primary or secondary cluster device. Accordingly, the device may not actively communicate with other cluster devices, may not accept tasks from the cluster master, and/or enter an active state if/when other cluster device(s) are failed over.

When in the active member state 230, the device may be configured to operate in one of a plurality of operational roles including, but not limited to: cluster master, backup master, and active. The cluster master may be configured to manage the cluster, which may include, but is not limited to: maintaining a list of the devices in the cluster (e.g., a list of active and standby devices), assigning processing tasks to the active devices, maintaining global, run-time synchronization data, managing shared resources, assigning tasks to active cluster members (e.g., perform a load balancing function), handling network flows, monitoring cluster health, managing device failover (e.g., providing for activation of standby cluster members in response to a failure of one or more of the active devices), and the like. The global, run-time synchronization data may include a flow assignment data structure comprising a mapping between the network flows handled by the cluster and the cluster device assigned thereto, flow, run-time synchronization data for each of the flows (e.g., session information, such as cache data, session keys, security data, and the like), shared resource data (e.g., address pools, port pools, hostout data, and the like), and so on.

When operating as a backup master device, the device may be configured to receive global, run-time synchronization data from the cluster master (e.g., maintain the same set of data as the cluster master). Accordingly, the backup master may quickly take over the role of the cluster master if needed (e.g., if the cluster master fails, has its health score fall below a threshold, or the like).

An active cluster device may be configured to handle network flows assigned thereto by the cluster master. In addition, an active cluster device may monitor the health of other cluster members (e.g., the cluster master). The cluster master and/or backup master may be configured to operate as active cluster devices (e.g., may process network flows, monitor other cluster devices, and the like). The active cluster devices may be configured to transmit flow, run-time synchronization data to the cluster master. The flow, run-time synchronization data may include data pertaining to each of the network flow(s) handled by the device. The flow, run-time synchronization data may be used in a failover operation to allow another device to handle the flow with minimal service disruption.

The cluster formation process described above may include selection of a cluster master. In some embodiments, the cluster master may be the first device added to the cluster (e.g., the first device configured to operate in clustered mode). Alternatively, or in addition, a cluster master may be periodically selected by a human operator (e.g., via a configuration interface) and/or by the devices in the cluster (e.g., in response to the cluster master failing, the cluster master's health score (discussed below) falling below a threshold, after a predetermined time threshold, or the like).

Figure 2B:
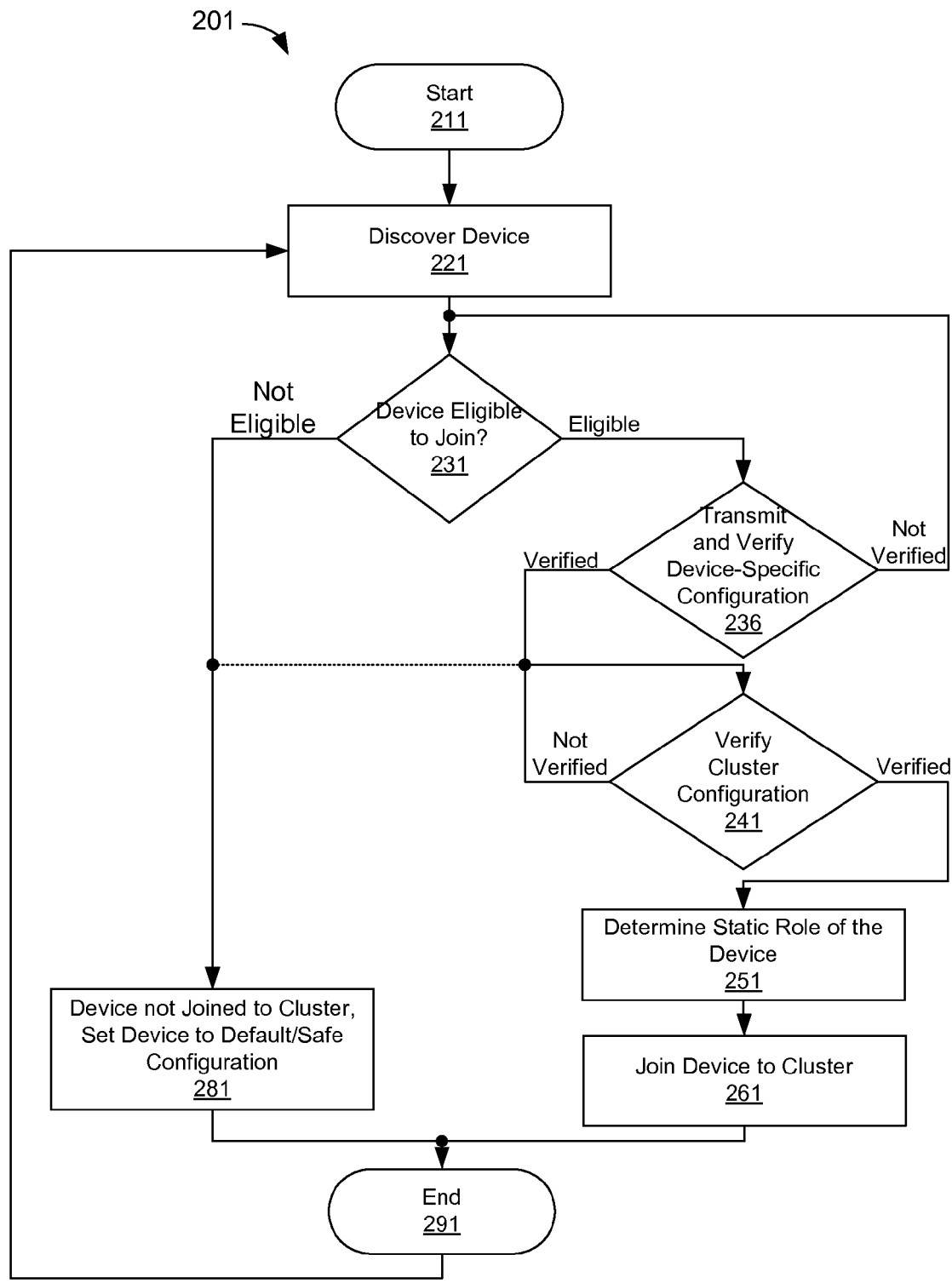
FIG. 2B is a flow diagram of one embodiment of a method for adding a device to a cluster.

FIG. 2B is a flow diagram of a method 201 for adding a device (network security device) to a cluster. The method 201 may be implemented on a computing device comprising a processor and memory using one or more computer-readable and/or computer-executable instructions. The instructions comprising the method 201 may be embodied as one or more distinct software modules, which may be stored on a computer-readable storage medium, such as a hard disc, optical storage media, memory, or the like. In some embodiments, one or more steps of the method 201 may be tied to particular machine components, such as computer-readable storage media, communications interfaces, processing modules, or the like.

At step 211, the method 201 may be initialized, which may comprise loading one or more computer-readable instructions from one or more computer-readable storage media, accessing and/or initializing one or more communications interfaces, and the like.

At step 221, the method 201 may discover a device. Discovering the device may comprise detecting a communications interface of the new device. For example, the new device be communicatively coupled to network interface used by the cluster (e.g., network interface 120, 122, and/or 124 of FIG. 1), one or more communications interfaces of the device may be activated, a configuration of the device may be set such that the device is capable of communication with other cluster devices or the like. Discovering the device at step 221 may comprise active discovery and/or passive discovery. Active discovery may comprise the method 201 transmitting network traffic (e.g., broadcast packets, or the like), which may be received (and responded to) by the device. The discovery messages may be transmitted automatically and/or periodically. Alternatively, the method 201 may transmit discovery messages only if instructed to do so (e.g., via a configuration interface, an SNMP message, or the like). Passive discovery may comprise the method 201 monitoring network traffic (e.g., for ARP requests, DHCP requests, or the like), accessing router ARP tables, or the like to discover the device without actively transmitting network traffic thereto.

At step 231, the eligibility of the device to join the cluster may be determined. In some embodiments, determining the eligibility of the device to join the cluster may be based upon device-identifying information, such as an indicator of the version or revision of the device (e.g., software version, firmware version, hardware revision, etc.), the capabilities of the device (e.g., hardware capabilities, such as processor speed, memory, and the like, software installed, etc.), device licensing information, and so on. For example, the cluster may be configured to only accept certain devices (or device versions) that have certain processing capabilities (e.g., processing speed, memory capacity, communications interface capabilities, such as a gigabit Ethernet interface, or the like). Step 231 may comprise the method 201 interrogating the device to determine certain device properties (e.g., hardware configuration, software version, firmware version, etc). If the device is not eligible to join the cluster (does not meet the software or hardware requirements for cluster membership), the flow may continue at step 281; otherwise, the method 201 may continue to step 236.

At step 236, a device-specific configuration may be transmitted to the device, and device implementation thereof may be validated. The transmission of the device-specific configuration at step 236 may comprise selecting device-specific configuration data from a plurality of different device-specific configurations, each of which may be adapted to particular device hardware and/or software configuration or version. The selection may be based upon the device-identifying information obtained at step 231. Step 236 may further comprise verifying that the device has implemented the device-specific configuration. Verification may comprise the device transmitting a confirmation message to the method 201, the method 201 interrogating the device (e.g., for a hash value or other indicator of the device-specific configuration), or the like. If the device-specific configuration is verified at step 236, the flow may continue to step 241. Otherwise, the flow may return to step 236 where the eligibility of the device to join the cluster may be re-determined and/or the device-specific configuration may be re-transmitted. Alternatively, or after a predetermined number of device-specific configuration verification failures, the flow may continue to step 281.

At step 241, a cluster configuration may verified. In some embodiments, the cluster configuration may be included with the device-specific configuration. Alternatively, the cluster configuration may be transmitted separately (e.g., transmitted at step 241). As discussed above, the cluster configuration may include a security policy implemented by the cluster, identifiers of the devices in the cluster, cluster communication configuration (e.g., cluster port assignment(s), interface port assignment(s), and the like), and the like.

Step 241 may further comprise verifying that the device has implemented the cluster configuration. The verification of step 241 may comprise the device transmitting a confirmation message to the method 201, the method 201 actively interrogating the device, or the like. If the cluster configuration is verified, the flow may continue to step 251; otherwise, the flow may return to step 241, where the cluster configuration may be re-transmitted to the device and re-verified by the method 201. Alternatively, or after a threshold number of cluster configuration verification failures, the flow may continue to step 281.

At step 251, a static role of the device may be determined. Determining a static role of the device may comprise accessing a license of the device, evaluating the device-identifying information about the device, and so on. Accordingly, assignment of the device role in the cluster may be determined and transmitted with the device-specific configuration at step 236. Alternatively, the role assignment may be made in a separate step 251 as depicted in FIG. 2B.

At step 251, if the device is not licensed, or a license of the cluster defines a maximum number of active devices, which has already been met, the device may be assigned a static role of "secondary" or "standby." When in the secondary or standby role, the device may not be assigned cluster processing tasks (e.g., handle network flows). If the device is licensed and/or a maximum number of active devices defined in a cluster license has not been met, the device may be assigned a static role of "primary" or "active." When in the primary or active role, the device may be available to perform cluster processing tasks (e.g., handle network flows). Assigning a role to the device may further comprise electing the device to act as a cluster master or backup master as described above. For example, if the device is the first device in the cluster, the device may be automatically selected as the cluster master. Similarly, if the cluster does not yet have a backup master, the device may be given the role of backup master.

In some embodiments, step 251 may further comprise determining the licensed capabilities of the cluster. If the device has its own license, the license may be transmitted to the device implementing the method 201. The license may be combined with the licenses of the other devices in the cluster (if any). The licensed capabilities of the cluster may define the capabilities thereof, which may include, but are not limited to: the number of active connections supported by the cluster, the throughput of the cluster, the services provided by the cluster (e.g., VPN, SSL, etc.), the number of active devices in the cluster, and so on. In some embodiments, the licenses may be combined by determining the least common capabilities therebetween (e.g., if a first license allows 500 concurrent connections, and a second license allows 700 concurrent connections, the cluster may be licensed to the lower number of concurrent connections, or 500 concurrent connections). Alternatively, the combination may be additive or according to the maximum capabilities of the licenses. Different licensed features may be combined in different ways (e.g., certain capabilities may be determined according to least common capability, while others may be additive, and so on).

At step 261, the device may join the cluster in its assigned role (the static role determined at step 251). If the device has been assigned an active role within the cluster, joining the cluster at step 261 may comprise configuring the other members of the cluster to communicate with the device (e.g., using a secure, cluster communications protocol), configuring the cluster master to assign processing tasks to the device (e.g., assign network flows to the device), and so on. Accordingly, joining the cluster may comprise the cluster master (or other cluster device) provide a shared key to the device to allow the device to securely communicate with other cluster devices. Alternatively, or in addition, joining may comprise performing a key exchange operation with one or more cluster devices to establish shared keys therewith.

If the device has been selected to operate as the cluster master, joining the cluster at step 261 may comprise initializing cluster master data structure, such as a flow assignment data structure, global, run-time synchronization data structure, shared resource data structure, and the like. The device may be configured to receive and assign network flows to cluster devices as described herein. In addition, the device may be configured to synchronize global, run-time synchronization data with a backup master device (if any). If the device is configured to operate as the backup master of the cluster, joining the cluster at step 261 may further comprise configuring the cluster master to synchronize global, run-time synchronization data with the device, which may include, but is not limited to: a flow assignment data structure, flow, run-time synchronization data (data associated with each of the assigned flows), shared resource data, and the like.

If the device has been assigned a standby role within the cluster, joining the cluster at step 261 may comprise operating in standby mode (e.g., passively synchronizing with the cluster master) until device failover occurs, at which point the device may transition to an active role as described above. Accordingly, joining the cluster as a standby device may comprise establishing a secure communications channel with the device, configuring the other cluster devices to use the device as a failover candidate (e.g., make the device available in the event of a failure of one of the other cluster devices), synchronizing cluster configuration and run-time data with the device, and the like.

At step 281, if the device is ineligible or unable to join the cluster, the device may be set as a non-member. Setting a device as a non-member may comprise configuring the device to operate in its default or "safe" configuration. In addition, other cluster devices may be configured to exclude the device from secure cluster communications, from eligibility for assignment of cluster processing tasks, from eligibility for use as a failover device, and the like. Accordingly, the device may not implement the cluster configuration, communicate with other cluster devices (e.g., have access to the secure, cluster communications channel), and so on. When reverted to the default or safe configuration, the device may be discoverable by other cluster members and, as such, may attempt to join the cluster at a later time (e.g., be discovered at step 211).

At step 291, the flow may terminate until another device becomes discoverable, cluster join requirements are modified (making non-member devices eligible to join the cluster), or the like.

Figure 3A:
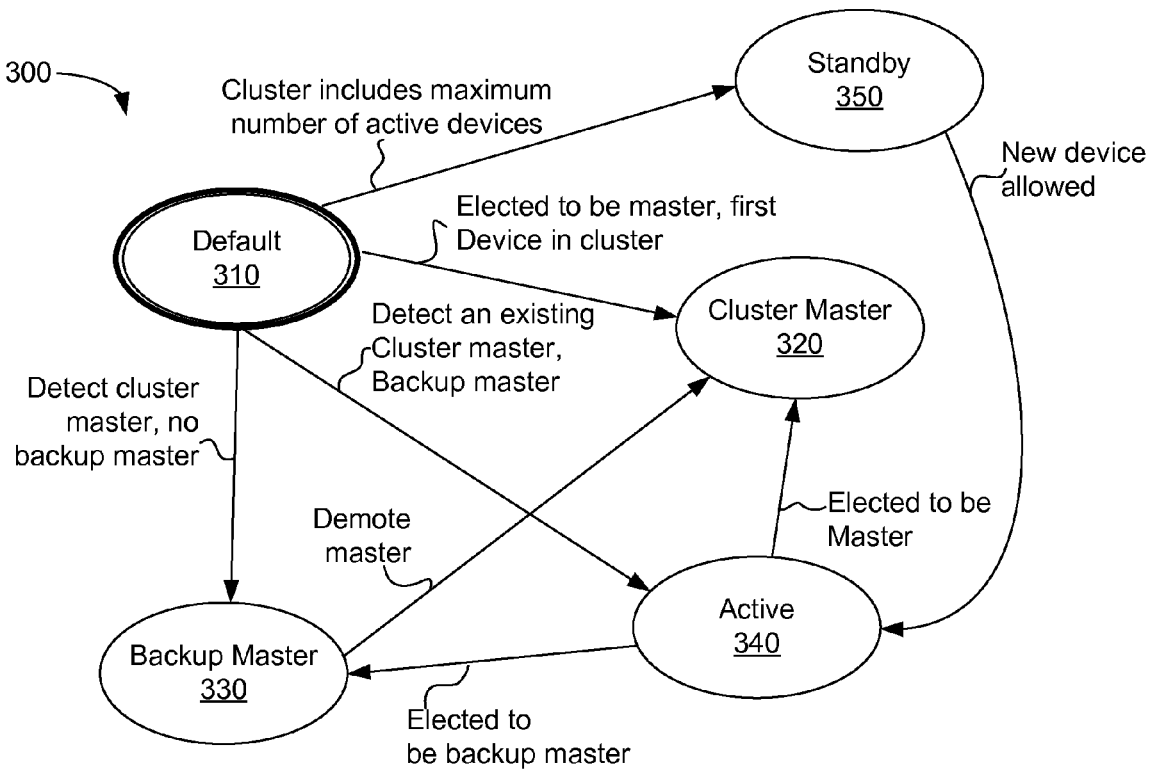
FIG. 3A depicts the relationships and/or transitions between cluster device operational modes.

FIG. 3A is a diagram 300 depicting the relationships and/or transitions between cluster device operation modes, such as cluster master, backup master, and active operational modes.

When a device is joined to a cluster, the device may begin operating in a default operational mode 310. As discussed above, if the device is the first device to join the cluster, the default operational mode 310 of the device may be the cluster master operational mode 320. If the device joins a cluster that already has a cluster master, but not backup master, the default operational mode 310 of the device may transition to be the backup master 330. If the cluster already includes devices operating as cluster master 320 and backup master 330, the default operational mode 310 of the device may transition to one of the active 340 or standby 350 modes.

A device may operate as an active cluster device 340 if the cluster can include additional active (worker) devices (e.g., according to the licensed capabilities of the cluster 300). The number of active cluster devices may be defined by a cluster configuration and/or licensing information (e.g., the configuration and/or license may specify that the cluster may include five active cluster devices). The number of active cluster devices allowed in the cluster may or may not include the cluster master 320 and/or backup master 330. If the cluster may accept additional active cluster devices, the device may transition from the default mode 310 to the active mode 340, in which the device may accept tasks from the cluster master 320. If the cluster already includes the maximum number of active cluster devices 340 and/or if the configuration data specifies that a certain proportion of the devices in the cluster be allocated to high-availability (standby mode 350), the device may transition to the standby mode 350. As discussed above, a device in standby mode 350 may not actively perform processing tasks assigned by the cluster master, but may actively synchronize cluster configuration data. Accordingly, when the device transitions from standby mode 350 to active mode 340 (e.g., due to a change in cluster configuration, licensing, device failure, etc.), the device may be ready to begin performing tasks assigned thereto without first synchronizing cluster configuration data. Other changes in the cluster configuration may require that one or more active devices 340 transition back to standby mode 350. The transition may include the devices continuing to synchronize cluster configuration data, but not accepting processing tasks (network flows) from the cluster master 320.

If the device operating as the cluster master 320 is demoted, another device may become (or be "elected" as) the cluster master 320. A device may be demoted from cluster master 320 for a number of different reasons including, but not limited to: device failure (hardware, software, communications interface, or the like), device health score falling below a threshold, configuration message from a human operator, automatic demotion (e.g., as a result of a failure detected within the device by the cluster master device or another monitoring device), or the like.

When the cluster master 320 is demoted, a failover operation may occur. Failover may comprise promoting another device to operate as the cluster master 340. If the cluster includes a backup master device 330, the backup master device 330 may be elected as the new cluster master 320. Promoting the backup master 330 to the master 320 may include configuring the other devices in the cluster (e.g., the active devices 340 and/or demoted cluster master 320) to use the backup master device 330 as the new cluster master). Since the backup master 330 may be synchronized to the cluster master 320 (may have been receiving updates to the global, run-time synchronization data from the cluster master 32, such as flow assignment data, shared resource, data, session data, security data, and the like), the transition to the new cluster master 320 may be performed without incurring downtime and/or interrupting the services provided by the cluster.

In some embodiments, the backup master 330 may only be elected to the cluster master 320 operational mode if it satisfies some election criterion, which may relate to a minimum health score of the device, device hardware capabilities, processing load, or the like. If the backup master 330 does not satisfy these criteria, and another cluster device does, another device other than the backup master 330 may be elected to operate as the cluster master 320. The election may comprise the backup master transmitting the global, run-time synchronization data maintained thereby to the new device. The performance penalty suffered by transmitting the global, run-time synchronization data to the new cluster master may be mitigated by the fact that a device better suited to act as the cluster master is put into place (e.g., reducing the chance of another failure in the short term). Alternatively, or in addition, if the backup master 330 is deemed to be unsuitable to act as the cluster master (and other cluster device is selected instead), the backup master 330 may act as the cluster master 320 for a "transition period," until the global, run-time synchronization data is transmitted to the more suitable device, after which the more suitable device may transition to cluster master 320, and the backup master may resume its former role.

Transitioning the backup master 330 to operate as the cluster master 320 may include electing another device in the cluster to operate as the backup master 330. If another device is available to act as a backup master 330, the device may be configured to transition to the backup master 330. The transition of a cluster device to backup master 330 may comprise transmitting the global, run-time synchronization data to the new backup master 330 (from the former backup master 330 or the failed over cluster master 320). In some embodiments, electing a new backup master 330 may comprise determining which, if any, cluster devices 340 or 350 are eligible to operate in the backup master operational mode 330 (e.g., based upon health score, processing load, device capabilities, such as processor speed, storage space, number and/or type of available communications interfaces, and the like). If more than one cluster devices are eligible for promotion to backup master 330, the election may comprise selecting the device with the higher health score, lower IP address, lower port number, or the like.

If no backup master 330 is available to replace the demoted cluster master 320, a new cluster master 320 may be selected from the active cluster devices 340. The election may operate as described above (e.g., based on device capabilities, health score, load, port number, or the like). Following the election of the new cluster master 320, a new backup master 330 may be elected as described above.

Figure 3B:
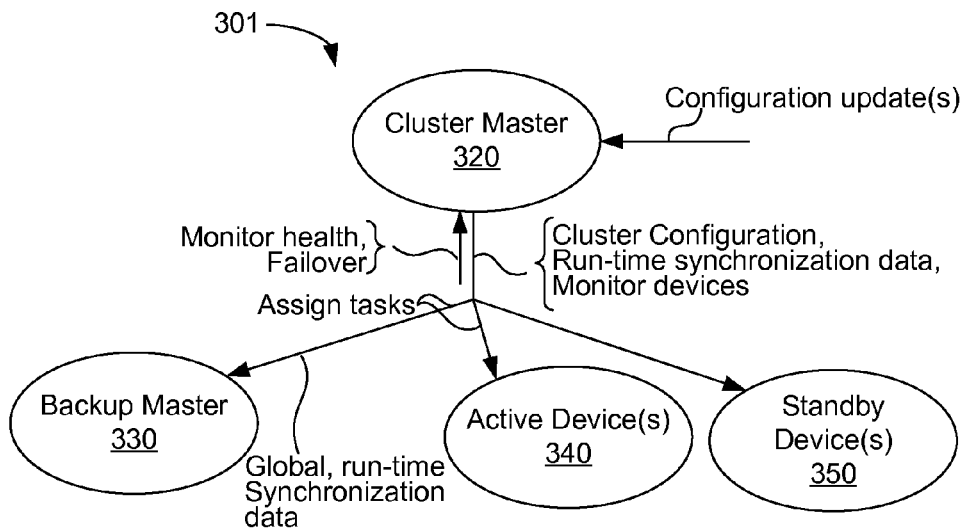
FIG. 3B depicts data flow between cluster devices.

FIG. 3B depicts data flow 301 between cluster devices. As discussed above, run-time synchronization data for load sharing and/or failover transparency may be synchronized between cluster devices. In some embodiments, the cluster master 320 may be configured to synchronize cluster configuration (e.g., cluster configuration updates), flow, run-time synchronization data, shared source data and the like to the cluster devices (e.g., the backup master 330, active device(s) 340, and/or standby device(s) 350). As shown in FIG. 3B, the cluster master 320 may receive configuration updates (e.g., from a human operator via a configuration interface, from a policy server, or the like). The configuration updates may include modifications to the cluster policy. The cluster master 320 may synchronize updates to the cluster policy to the cluster devices 330, 340, and/or 350. Synchronizing the cluster policy may include modifying an operational mode of one or more cluster devices (e.g., transitioning devices operating in standby 350 to active mode 340, or the like).

The cluster master 320 may be configured synchronize the global, run-time synchronization data with the backup master 330. As discussed above, the global, run-time synchronization data may include data needed for cluster master failover transparency, such as flow assignment information (e.g., flow assignment data structure), flow, run-time synchronization data, shared resource information (e.g., address pools, port pools, and so on), shared services information (e.g., security keys, security associations, etc.), and the like.

In some embodiments, the backup master 330 may be configured to transmit an acknowledgement message to the cluster master 320 responsive to receiving global, run-time synchronization data therefrom. The acknowledgement may be used by the cluster master 320 to verify that the global, run-time synchronization data was received. If the cluster master 320 does not receive an acknowledgement from the backup master 330 within a threshold period of time, the global, run-time synchronization data may be retransmitted to the backup master, and/or a new backup master 330 may be elected as described above (a backup master failover operation may be performed). The global, run-time synchronization data, cluster configuration, and other cluster state information (e.g., key negotiation requests, etc.) distributed via the device cluster interface ports (e.g., ports 111A-111C of FIG. 1).

The cluster master 320 may be configured to distribute network traffic and/or flow processing tasks to the devices, including the active devices 340, the cluster master 320 itself, and/or the backup master 330 (the cluster master 320 and the backup master 330 may be used as "active" cluster devices for the purposes of flow processing). The cluster master 320 may maintain a data structure indicating which tasks have been assigned to which cluster members (a flow assignment data structure described below). The flow assignment data structure may include an enumeration of the network flows (e.g., network connections, VPN connection, etc), being serviced by the cluster and identify which device is servicing which flow. The cluster master may, therefore, monitor which devices are heavily loaded and which are less loaded and make task assignment decisions accordingly. As will be discussed below, the cluster configuration may define one or more flow assignment rules, which may specify which devices are eligible to handle which flows (e.g., based upon existing flow assignments, security group information, session state, efficiency considerations, or the like).

The data sent between the cluster devices (e.g., cluster configuration data, cluster state synchronization data, etc.) may be transmitted using a secure communications channel. In some embodiments, data may be encrypted and/or digitally signed. As discussed above, inter-cluster communications may be implemented on a cluster interface port (port 111A-111C of FIG. 1). The cluster interface ports may implement a high-performance protocol that is resistant to application-layer failures. One example of a high-performance, low-level communications protocol is described below.

The active cluster devices 340 and/or backup master 330 may be configured to transmit flow, run-time synchronization data to the cluster master 320. The flow, run-time synchronization data may include data relating to the flow(s) handled by the respective device(s). Accordingly, the flow run-time synchronization data may include all the data needed to transition a flow from one cluster device to another cluster device in the event of a failover operation. The flow, run-time synchronization data may include flow session data, security information (e.g., security association sequence information number, shared keys, etc.), flow termination, addition and/or removal of rules on a data channel, flow port assignments, flow cache, and the like.

The cluster master 320 may aggregate the flow, run-time synchronization information received from the cluster devices into a global, run-time synchronization data structure, which may be synchronized with the backup master 330. As will be discussed below, when a device handling a particular set of flows is failed over, the flows may be transitioned to one or more other cluster devices. The flow run-time synchronization data corresponding to each of the transitioned flows may allow the replacement cluster device to resume processing the flows with minimal interruption of service. In addition, the cluster master 320 may synchronize the global, run-time synchronization data (including the flow, run-time synchronization data of each of the flows), to the backup master 330 to provide protection in the event of a failover operation of the cluster master 320 (e.g., in the event that the cluster master 320 goes down, to be replaced by the backup master 330 or some other cluster device).

The global, run-time synchronization data may include other types of synchronization data, such as synchronization data pertaining to shared resources managed by the cluster master 320, shared services provided by the cluster master 320, cluster configuration data, and the like. For instance, in some embodiments, the cluster master 320 may manage IP security (IPSec) data across the cluster. Accordingly, the cluster master 320 may implement an Internet Key Exchange (IKE) module, which may provide shared IKE services to the other devices in the cluster (one example of such a configuration is described below in conjunction with FIG. 9A). When the cluster master 320 is configured to provide a shared IKE, the cluster master 320 may provide call backs for use by the other cluster devices in the negotiation of security associations (e.g., phase 1 security associations, phase 2 security associations, etc.), perform dead peer detection, terminate IPSec flows, and the like. The global, run-time synchronization data synchronized from the cluster master 320 to the backup master 330 may include the IKE module data to provide for IKE module failover.

The cluster master may manage the shared resources of the cluster. Shared resource information may be maintained within the global, run-time synchronization data structure discussed above (e.g., along with the flow assignment data structure, run-time flow synchronization data, and other cluster synchronization data managed by the cluster master). The shared resources managed by the cluster master may include, but are not limited to: shared address pools, port pools, hostout traffic configuration, and the like. In some embodiments, the cluster master may act as a Dynamic Host Configuration Protocol (DHCP) server to dynamically assign IP addresses to DHCP and/or to MOVPN clients (e.g., IPSec, SSL, PPTP, and the like). The cluster master 320 may maintain an address pool data structure indicating which addresses have been assigned to which clients. The address pool data structure may be included in the global, run-time synchronization data that is synchronized from the cluster master 320 to the backup master 330.

The cluster master may also manage a port pool for DNAT. When DNAT is used, the source IP address of a network flow may be replaced with a fixed IP address, while a source port thereof is replaced with a port number obtained from a managed port pool. The assigned port number may be reserved for use by the corresponding flow (e.g., the port may not be used for other network traffic, such as other network flows, while port is in use by the assigned flow). Hence, the cluster master may maintain a port pool comprising a data structure indicating which ports have been assigned to which flows. The port pool information may be included in the global, run-time synchronization data synchronized from the cluster master 320 to the backup master 330.

The cluster master 320 may manage hostout traffic, which may include network traffic that is initiated by cluster devices (individual cluster members 320, 330, 340, and/or 350). The hostout traffic may be used for various purposes including, but not limited to: sending data to a quarantine server (e.g., in virus scanning, spam filtering, or the like), sending logging information to a log server, sending Simple Network Management Protocol (SNMP) traps to an SNMP manager, and the like. The hostout traffic may use the shared cluster address (the cluster IP address) as the source of the traffic. Since the cluster address is shared, each cluster device that initiates hostout communications may be assigned a different port, to prevent port conflicts between devices. The cluster master 320 may maintain a hostout data structure indicating which hostout ports have been assigned to which cluster devices. The hostout data structure may be included in the global, run-time synchronization data that the cluster master 320 synchronizes with the backup master 330.

The cluster master 320 may also manage shared resources associated with network flows. For example, certain network flows may require the use of particular ports. For example, when an FTP session receives a "port" command or passive response the cluster device handling the flow may be required to request of port number for the FTP session from the cluster master 320. The cluster master 320 may use the port pool (or other data structure) to determine which ports are available for use by the flow and/or to prevent a port conflict between network flows being handled on different cluster devices. The cluster master 320 may use the port pool (discussed above), or another data structure, to prevent port conflicts. The data structure may include in the global, run-time synchronization data, which may be synchronized to the backup master 330 by the cluster master 320.

Although the disclosure provides various examples of global, run-time synchronization data that may be synchronized within the cluster of FIG. 3B, the disclosure is not limited in this regard. The global, run-time synchronization data described herein could include any type of data and/or data structure known in the art. Similarly, synchronization data transmitted to the cluster master 320 from the cluster devices 330, 340, and/or 350 (e.g., flow, run-time synchronization data) could include any data and/or data structure known in the art.

In some embodiments, the cluster devices (e.g., the cluster master 320, backup master 330, worker devices 340, and/or standby devices 350) may be configured to monitor the operational status of one another. Responsive to the monitoring, the cluster device(s) may take one of several possible actions including, but not limited to: replacing the cluster master 320 with another cluster device, replacing the backup master 330 with another device, failing over a device (e.g., replacing the device with another cluster device), or the like.

The cluster devices may implement a monitoring function in various different ways. In one example, each of the cluster devices may generate and transmit periodic status messages. The status messages may be transmitted using a shared cluster interface (e.g., interface ports 111A-C of FIG. 1). The status messages may provide an indication that the cluster device is operational and capable of accepting tasks from the cluster master 320.

In some embodiments, the status messages may be used to communicate device performance and/or operational metrics, which may be used to calculate or derive a "health score", of the device. As used herein, a device health score may refer to data (e.g., embodied as one or more alpha numeric values, formatted data, or the like), which be indicative of the operational status of a cluster device. Accordingly, a health score may include, but is not limited to, providing indications of the status of one or more application layer modules implemented on the device; providing indications of the performance of the cluster device; providing indications of the status of the communications interfaces of the device; and the like.

For example, a device health score may include application-layer information, such as performance metrics of various device application-layer modules (e.g., traffic processing modules, etc.), the number of packets processed by the application per unit time, application throughput, may provide a record of application-layer faults and/or application-layer exceptions, provide application resource usage metrics (e.g., memory usage, processor usage, etc.), and the like. The application-layer information in the health score may be provided on a per-application basis and/or as an aggregate of all application-layer modules. Other health score metrics may quantify the overall performance of the cluster device, such as network throughput, overall processing load, system resource status, and the like. Health score metrics indicate the status of the communications interfaces of a cluster device. For example, the health score may indicate which (if any) communications interfaces are down (e.g., interface link status), provide interface-specific signal-to-noise ratio(s), provide indications of interface collision(s), provide indications of communication interface load, and the like.

In some embodiments, certain components of the health score may be more heavily weighted than others. The weighting may allow an administrator to configure the health score to emphasize certain aspects of device performance and/or health. For example, if a certain application or function is considered to be particular important to an organization, the administrator may configure the heath score to give added weight to device metrics relating to the application and/or function.

In some embodiments, the health score of a device may include a failover request. For example, the device may be due for maintenance (e.g., a software or hardware updates). Responsive to the maintenance requirement, the device may transmit a status message comprising a health score (or other data), indicating that the device is to be taken down. Similarly, when the device determines that it is no longer providing acceptable levels or service (e.g., due to application-layer failures, such as VPN failure, anti-virus failure, or the like), the device may transmit a status message comprising a request for failover.

The status messages of the cluster devices may be used to determine which cluster devices should be selected to perform particular processing tasks, elect cluster devices to perform different roles within the cluster (e.g., cluster master 20, backup master 330, worker 340, etc.), provide a quantitative gauge of the performance of the cluster device, provide an indication of the stability of the device, provide an operational status of the device (e.g., indicate which services or tasks the device is capable of performing), provide an indication as to whether the device is likely to fail within a particular time frame, and so on.

As discussed above, in some embodiments, a health score (or data from which a health score may be derived) may be included in the periodic status messages transmitted from a cluster device to the other cluster members (e.g., via the cluster interface port 111A-C of FIG. 1). The status messages (and/or the health score data therein) may be used to monitor the cluster devices, which may comprise: performing failover operations, assigning processing tasks (network flows) to various cluster devices, electing devices to act as the cluster master 320 and/or backup master 330, and so on.

For example, in some embodiments, the health score of a device may be used to detect device instability which, may be indicative that the device is about to fail and/or is not operating properly. If the health score indicates that a device is about to fail, other cluster devices may implement a preemptive failover operation to failover the device before it crashes. A preemptive failover may provide for a more efficient transition to a replacement device, which may minimize interruption to the services provided by the cluster. Similarly, the health score of a cluster master 320 or backup master 330 may be used to invoke a preemptive failover to replacement cluster master 320 and/or backup master 330 devices.

The selection of a replacement cluster master 320 and/or backup master 330 may be predicated upon, inter alia, the respective health scores of the available cluster devices (e.g., a cluster device having a low health score may be excluded from election as the cluster master 320 or backup master 330).

Failover of an active cluster device (e.g., the cluster master 320, backup master 330, or worker 340) may occur responsive to one or more failover conditions including, but not limited to: loss of communication with the device (e.g., based upon device link status), communications interface failures (e.g., failures in one or more non-cluster communications interfaces), device crash (e.g., non responsive despite the existence of a communications link), heath score below a threshold, in response to a configuration command (e.g., a command to bring down the device to perform device maintenance, device upgrades, or the like), and so on.

Upon detecting failover conditions in a particular cluster device, the other devices in the cluster may implement a failover operation to replace the failed over device with another device. The nature of a failover operation may vary according to the operational role of the failed device.

For example, a cluster master failover may comprise selecting a new cluster master 320 from the other cluster devices. The selection of the new cluster may be made by the remaining cluster members as a whole to ensure that only one device is configured to act as the cluster master 320 at any one time. The selection of a replacement cluster master 320 may be based on the current role of each of the remaining cluster devices. For example, if the cluster includes a backup master 330, the backup master 330 device may transition to be the new cluster master 320 (since it is already synchronized with the cluster master). If there is no backup master 330, or the backup master device also satisfies failover conditions (has failed or is on the verge of failing), a worker 340 or standby 350 device may be selected. The selection may be based upon device health score, processing load, IP address, connection speed, random selection, or the like. If the backup master 330 is operable (but not suitable as the cluster master 320), the backup master 330 may be configured to synchronize the global, run-time synchronization data to the replacement cluster master before being failed over itself.

If the device to be failed over is the backup master 330, a suitable replacement may be selected as described above. The failover to a replacement backup master 330 may comprise synchronizing the global, run-time synchronization to the new device from the cluster master 320 and/or backup master 330, if possible.

The device to the failed over may be actively performing cluster processing tasks (e.g., handling network flows). A failover operation may comprise transitioning network flows assigned to the failed device to one or more available cluster devices. Transitioning a network from a first device (failed device) to a second replacement device may comprise transmitting to the second replacement device any flow, run-time synchronization data pertaining to the flow. The flow, run-time synchronization data may be transmitted to the second replacement device by the cluster master 320 or backup master 330, both of which may maintain synchronized global, run-time synchronization data structures comprising the flow, run-time synchronization data pertaining to the flows. The transition may further comprise the cluster master 320 configuring the second replacement to handle the transitioned network flows, updating the flow assignment data structure within the global, run-time synchronization data, and (if operating in "direct-forward" mode) configuring an inbound network interface to forward network traffic associated with the flow to the second replacement device.

Figure 3C:
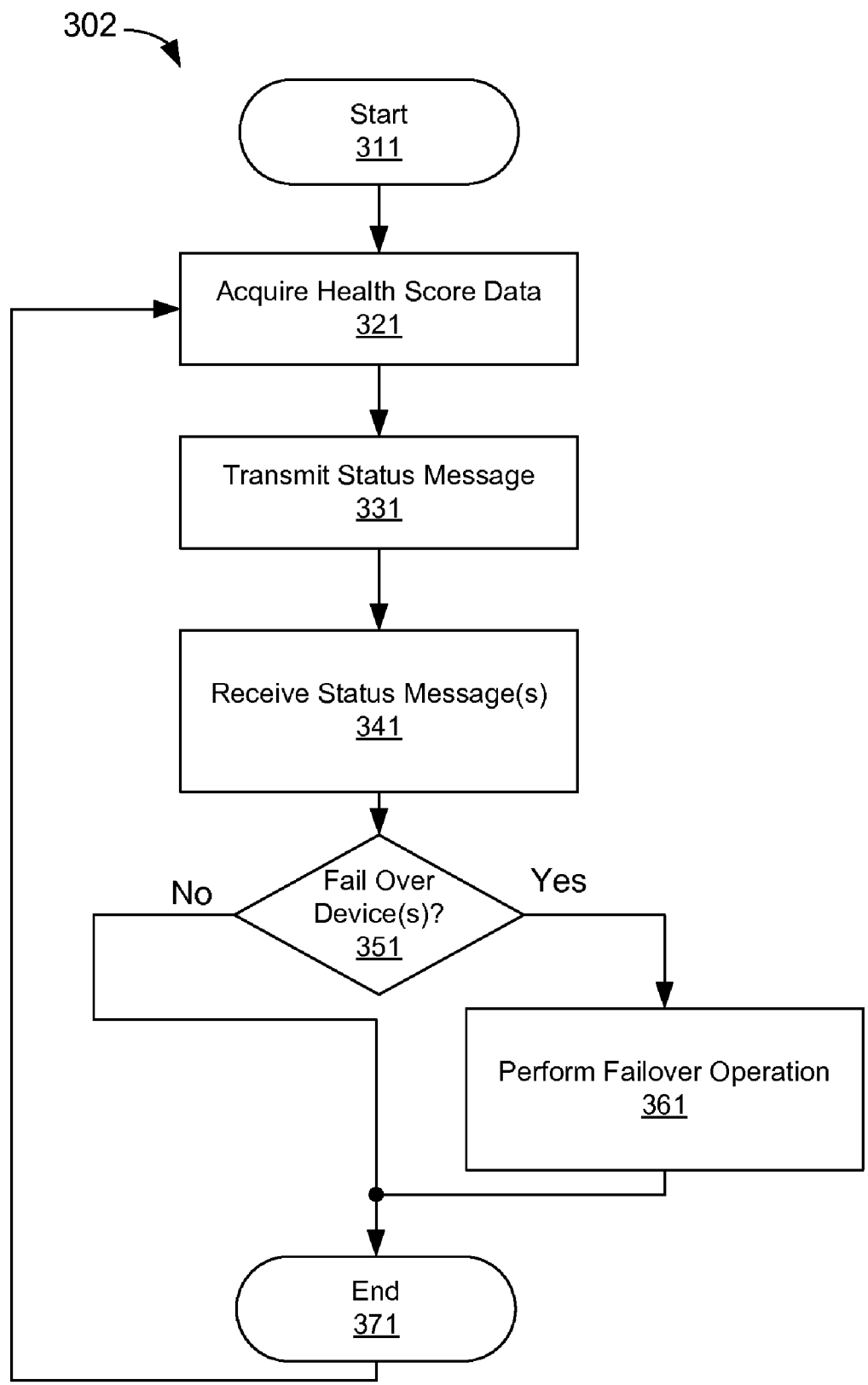
FIG. 3C is a flow diagram of one embodiment of a method for monitoring cluster devices.

FIG. 3C is a flow diagram of one embodiment of a method 302 for monitoring a cluster using devices within the cluster. The method 301 may be implemented on a computing device that has joined a cluster as a cluster master, backup master, active member, and/or standby member. The cluster device implementing the method 302 may comprise a processor and memory. The method 302 may be embodied on the cluster device as one or more computer-readable and/or computer-executable instructions, which may be embodied as one or more distinct software modules stored on a computer-readable storage medium of the cluster device (e.g., hard disc, optical storage media, memory, or the like). In some embodiments, one or more steps of the method 302 may be tied to particular device components, such as computer-readable storage media, communications interfaces, processors, or the like.

At step 311, the method 302 may be initialized, which may comprise loading one or more computer-readable instructions from one or more computer-readable storage media, accessing and/or initializing one or more communications interfaces, and the like.

At step 321, data indicative of a health score of the device implementing the method 302 may acquired. As discussed above, a health score may comprise information relating to the application layer of the device, device performance, device communications interface status, and the like. In some embodiments, step 321 may comprise calculating one or more alpha numeric health score values (e.g., a set of alpha numeric values, each relating to a different device health category). Alternatively, or in addition, step 321 may comprise acquiring data from which a health score of the device may be derived (e.g., raw performance statistics, operational parameters, logging information, and the like).

At step 331, a status message may be transmitted to other devices in the cluster. The status message may comprise the data acquired at step 321 (e.g., the health score and/or the data used to derive the health score). In some embodiments, the status message may be transmitted via a dedicated cluster communications interface port, such as the cluster interfaces 111A-111C of FIG. 1. Alternatively, or in addition, the status message may be directed to a dedicated cluster network interface, such as the cluster interface 124 of FIG. 1, which may comprise a switch, hub, concentrator, or other network communications device.

In some embodiments, the status message may be communicated using a cluster-specific communications protocol, which may provide for efficient communications that are resistant to application-layer failures. The cluster-specific communications protocol may be implemented below the application layer (e.g., in the data link layer or the like). The method 302 may be configured to generate and transmit status messages (e.g., perform steps 321 and 331) at regular intervals. Accordingly, other devices monitoring the device implementing the method 302 may detect a failure in the device using the status messages transmitted thereby and/or if no status messages from the device are received within a threshold time period.

At step 341, the method 302 may receive status messages from other devices in the cluster (e.g., via the dedicated cluster communications interface, cluster network interface, or the like). The status messages may include respective device health scores (or information from which respective device health scores may be determined), each corresponding to a respective cluster device. In some embodiments, the status messages may further include information describing the current configuration of the device (e.g., cluster configuration, security policy, software version, firmware version, etc.).

At step 351, the method 302 may determine whether any of the devices in the cluster are to be failed over. A device may be failed over when one or more failover conditions are satisfied. The method 351 may implement any number of different failover conditions, some of which may be based upon the health score of the device, and other which may be related to lower-level monitoring functions (e.g., link-level monitoring, connectivity, and the like). The failover conditions at step 351 may include, but are not limited to: the health score of the device falling below a threshold; the health score of the device being maintained below a threshold for a threshold time period; run-away device resource consumption as indicated by the health score (e.g., runaway processor load, memory usage, or the like); poor application-layer performance (e.g., if the health score indicates that one or more applications deemed to be critical (IPSec, VPN, anti-virus, etc.) are not performing adequately; device hardware failures (e.g., bad memory, disc, or the like); communications interface failures or performance degradation (e.g., low network throughput, high SNR ration, etc.); failure to receive status messages for a threshold time period; device link status; hardware or software configuration change; or the like.

If at step 351, one or more cluster devices are to be failed over, the flow may continue at step 361; otherwise, the method 302 may terminate at step 371 and/or continue as more status messages are received and/or when an updated status message is to be transmitted.

At step 361, a failover operation for the one or more devices identified at step 351 may be performed as described above. An example of a method for failing over a cluster device is described below in conjunction with FIG. 3D. After failing over the device, the method 302 may terminate at step 371 and/or may continue as more status messages are received from other cluster devices and/or when a periodic status message is to be transmitted from the device.

Figure 3D:
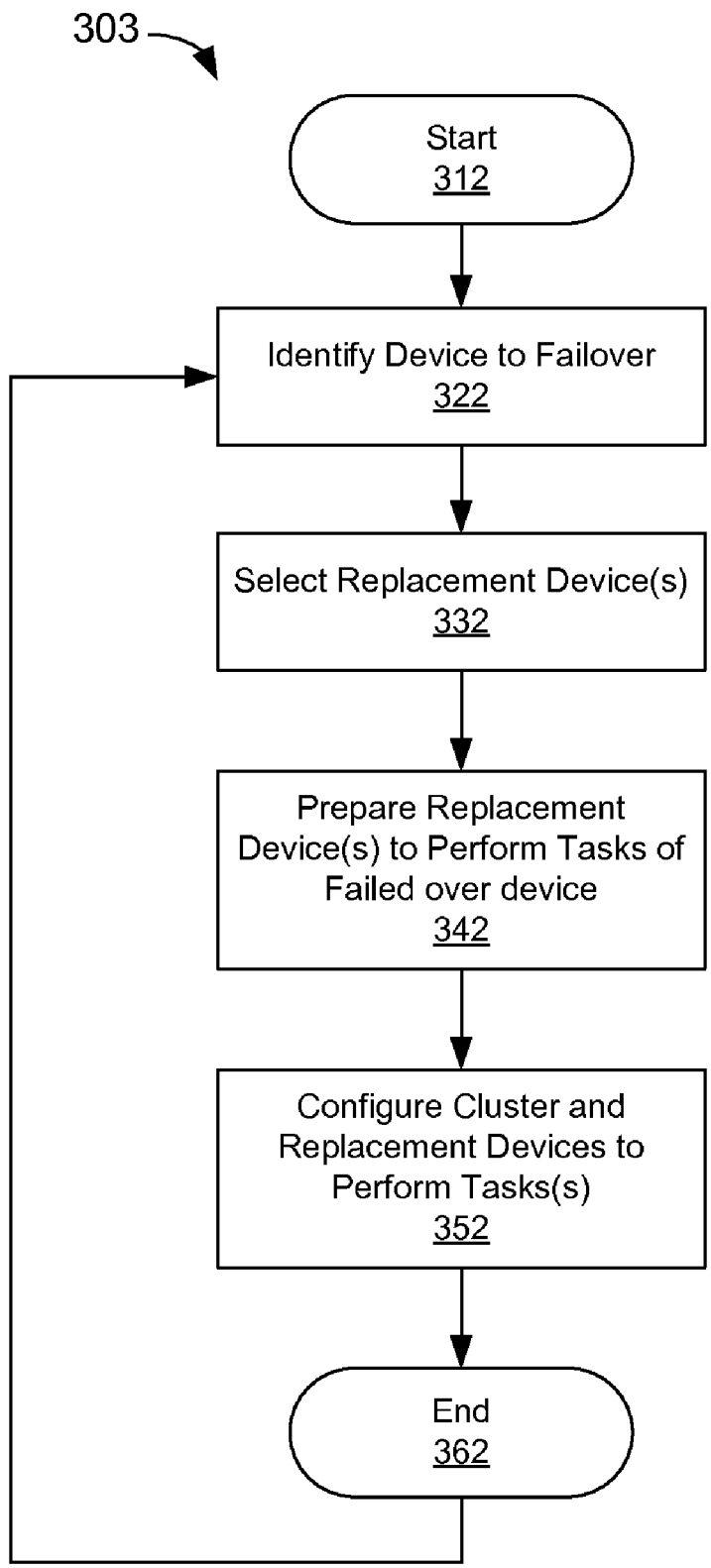
FIG. 3D is a flow diagram of one embodiment of a method for performing a cluster failover operation.

FIG. 3D is a flow diagram of one embodiment of a method 303 for failing over a cluster device. Like the method 302 described above, the method 303 may be implemented on and/or in conjunction with a cluster device comprising a processor, memory, communications interfaces, and the like. The method 303 may be implemented on the cluster device using one or more computer-readable instructions embodied as discrete software modules stored on a computer-readable medium.

At step 312, the method 303 may be initialized, which may comprise loading one or more instructions from a computer-readable medium, initializing communications interfaces, and the like.

At step 322, a device to be failed over may be identified. The identification of step 314 may be implemented by a method, such as method 302 described above in conjunction with FIG. 3C. Alternatively, the identification may be received from the device to be failed over (e.g., as an explicit failover request), received from an external source, such as a configuration interface or other management device (e.g., an SNMP message, user request, or the like), or the like.

At step 332, one or more available cluster devices to replace the failed device may be selected. The selection may be based upon health score of the other devices, the availability of standby devices, or the like. If the failed over device is operating as the cluster master, the selection of step 332 may give preference to a backup master (if available) as discussed above. If the backup master is selected to replace the cluster master, step 332 may further comprise selecting a replacement for the backup master.

At step 342, the one or more devices selected at step 332 may be prepared to handle the tasks of the failed over device. Preparing a device to handle a processing task may comprise transferring flow, run-time synchronization data to the device. For network flow processing, the flow, run-time synchronization data may comprise flow session information, such as IPSec data (e.g., P1SA, P2SA, shared keys, etc), flow cache, flow port shared resource allocations (e.g., DNAT ports, etc.), and the like. The flow, run-time synchronization data may be transferred from the cluster master and/or backup master. If neither the cluster master nor backup master is available and/or has the flow, run-time synchronization data, and one or more communications interfaces of the device to be failed over are active, the data may be transferred to the replacement devices directly from the failed over device (before it is brought down and/or removed from the cluster).

If at step 342, the device to be failed over is the cluster master, the preparation of step 342 may further comprise synchronizing the global, run-time synchronization data maintained by the cluster master to the replacement cluster master device. If the replacement cluster master device was formerly operating as the backup master, the global, run-time synchronization data may already have been synchronized. If not, the synchronization may take place between the backup master (if available) and the replacement cluster master or between the replacement device and the cluster master itself (if possible). If the backup master was selected to replace the cluster master at step 332, the preparation of step 342 may further comprise preparing a replacement for the backup master. Preparing a replacement for the backup master may comprise synchronizing the global, run-time synchronization data to the replacement backup master device.

At step 352, the cluster and the one or more replacement devices may be configured to perform the tasks of the failed over device. The configuration of step 352 may comprise updating a task assignment data structure to indicate which devices are handling the tasks formerly assigned to the failed over device. For example, a flow assignment data structure (discussed below) may be updated to indicate that the flows that were formerly being handled by the failed over device are not being handled by one or more replacement devices. If the cluster is operating in direct-forward mode, the configuration of step 352 may further comprise configuring an inbound network interface (e.g., interface 120 of FIG. 1) to forward traffic pertaining to the transferred flows to the corresponding replacement devices.

If the failed over device was the cluster master, the configuration of step 352 may comprise the replacement cluster master taking over management of shared cluster resources (e.g., address pools, port pools, etc), performing task assignment (e.g., assigning network flows to various cluster devices), maintaining global, run-time synchronization data, managing shared services (e.g., shared security services, such as IKE, and the like), and so on. Step 352 may, therefore, comprise configuring the other devices in the cluster to use the replacement device as the cluster master. Accordingly, the devices may be configured to transmit flow, run-time synchronization data to the new cluster master, request shared resources from the new cluster master, access shared services from the new cluster master, and so on.

At step 362, the method 303 may terminate until another failover operation is to be performed.

In some cases, a cluster failure may be accompanied by a cluster partition, in which a first set of one or more cluster devices are cut off from communication with a second set of cluster devices. The election of a cluster master may be configured to prevent "cluster partitioning," in which each set of communicatively coupled cluster partitions elects its own cluster master (resulting in two concurrently running cluster masters 320). The cluster devices may detect a cluster partition (e.g., split syndrome in which some cluster devices cannot communicate with other cluster devices). The detection may comprise using a specially configured Ethernet frame to probe the multi-segment condition. If a multi-segment condition is detected, an active segment may be selected. The active segment may be the segment comprising the largest number of computing devices, the segment comprising the cluster master and/or backup master, or the like. When a device on an inactive segment reconnects to an "active segment" device, the device may be synchronized thereto. For example, the cluster master in the active segment may rejoin the device to the cluster as described above.

Referring back to FIG. 3B, the devices in the cluster 301 (cluster master 320, backup master 330, worker device(s) 340, and/or standby device(s) 350) may synchronize cluster information using a dedicated cluster interface port, such as the cluster interface ports 111A-111C of FIG. 1 (e.g., each device may dedicate a communications interface to cluster communications, which may be concentrated at a switch or other network element). In some embodiments, the cluster interface port may implement a specialized protocol configured to provide for high-speed, robust device-to-device communications. The protocol may operate at a low level to provide for cluster communication despite failures in the application layer of the device. For instance, the protocol may be implemented with the OSI data layer.

Referring back to FIG. 1, the cluster 110 may be configured to provide network security services with load balancing and/or high availability. Load balancing may be implemented by assigning flows (comprising network processing tasks) to cluster members as evenly as possible, while high availability may be implemented by reassigning flows to surviving cluster members (or standby cluster members) when a cluster device fails.

In some embodiments, the cluster 110 may implement a "flooding" technique, in which each arriving packet (received via the interface 120) may be forwarded to each of the cluster devices 112, 114, and 116. Each cluster device 112, 114, and 116 may examine the packet header and decide whether to handle the packet (e.g., based upon whether the device has been assigned to manage the flow associated with the packet). If so, the device may process the packet according to a policy implemented by the cluster 110; otherwise, the device may drop (ignore) the packet. If the packet is not associated with any known flow (e.g., a new inbound request, etc.), the cluster master may identify the flow as "new" and assign it to an active cluster device 112, 114, 116.

To operate in the flooding mode described above, the cluster master device (device 112) may send an address resolution protocol (ARP) reply to the interface 120 with a multicast Media Access Control (MAC) address. A generic multiple registration protocol (GMRP) may be used to prevent flooding network traffic to ports not used by the cluster 110. Certain network elements (e.g., routers) may require an ARP entry for the cluster master 110 to be manually inserted.

Alternatively, the interface master may send an ARP reply with an unknown unicast MAC address, which may cause the interface 120 to route inbound traffic to all of the devices (112, 114, and 116) in the cluster 110. However, some interface devices 120 may rate-limit traffic associated with unknown destination MAC addresses. In another example, the interface 120 may include a dump hub. The dump hub may flood inbound network traffic to the devices (112, 114, and 116) in the cluster 110. However, network traffic sent out by the cluster devices 112, 114, and/or 116 may loop back within the cluster 110 (e.g., traffic transmitted by device 112 may loop back to the devices 114 and 116, and so on).

In an alternative embodiment, the cluster 110 may be configured to operate in a "direct-forwarding" mode. Direct forwarding may be implemented using an interface 120 configured to route inbound network traffic to a particular device 112, 114, or 116 within the cluster 110. In a direct forwarding scheme, the cluster master (e.g., device 112) may register a virtual MAC address with the interface 120 (e.g., respond to an ARP request (virtual IP) from the interface 120 with a virtual MAC address). Therefore, unicast traffic will be routed to the cluster master 112 only (and not to the other devices 114 and 116 in the cluster 110). Multicast and/or broadcast traffic may be filtered by the devices (e.g., 114 and 116) that are not configured to act as the cluster master 112. When a flow is assigned to a particular device 112, 114, or 116 in the cluster 110, it may transmit a direct forward request to the interface 120. The direct forward request may specify the types of traffic that are to be forwarded to the device (e.g., in a traffic specification) and provide the MAC address of the device (112, 114, or 116) to which the traffic is to be forwarded. Using the information in the direct forward request, the interface 120 may identify traffic associated with the flow and forward the traffic directly to the device (as opposed to flooding each device 112, 114, and 116 therewith). If no flow is associated with the incoming traffic, the traffic may be forwarded to the cluster master, which may assign to flow to a cluster device 112, 114, 116.

Figure 4:
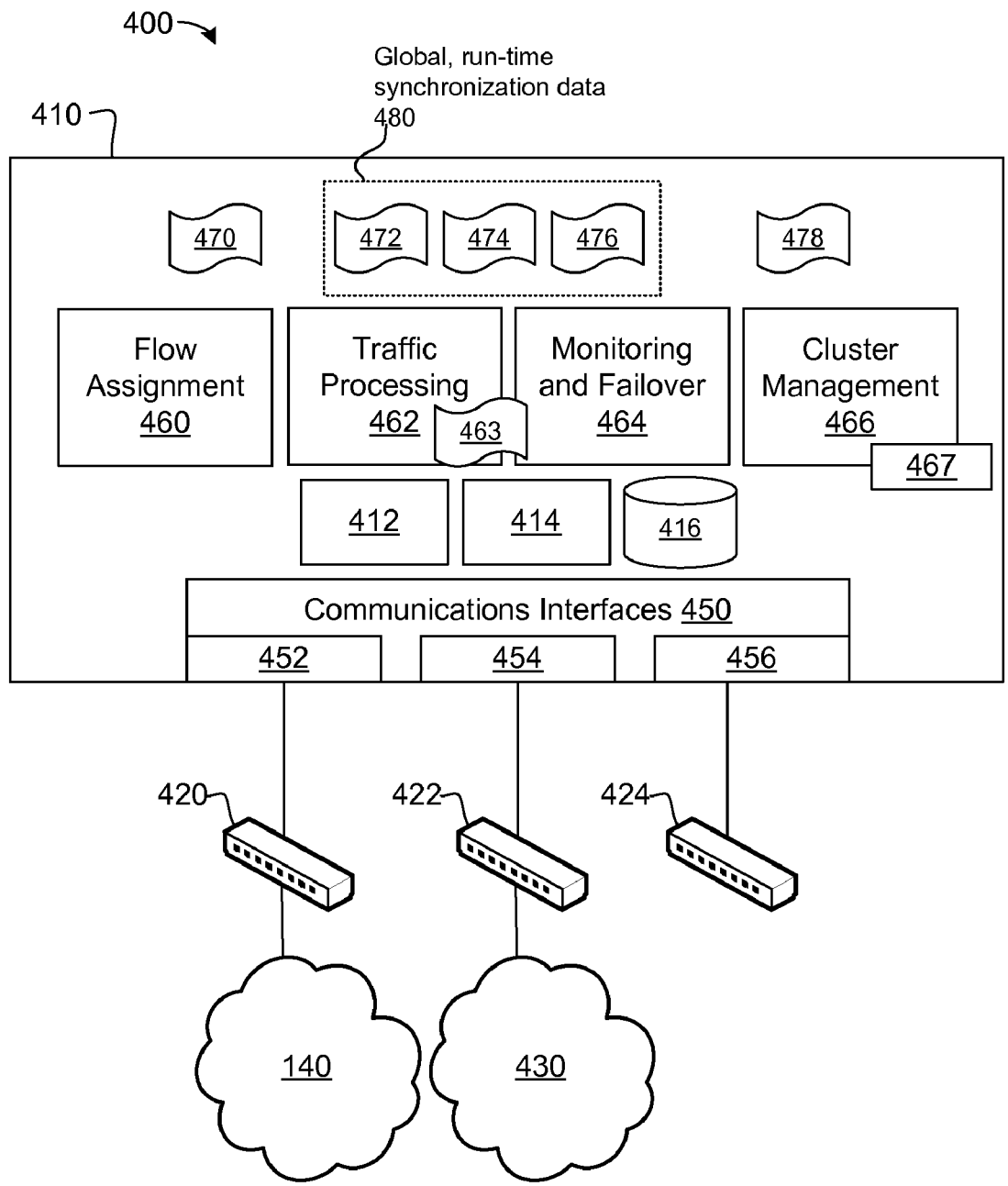
FIG. 4 is a block diagram of one embodiment of a cluster device.

FIG. 4 is a block diagram of one embodiment of a cluster device, such as 112, 114, and/or 116. The cluster device 400 may be implemented as and/or in conjunction with a computing-device 410 comprising a processor 412, memory storage 414, and computer-readable storage media 416. The processor 412 may comprise one or more general purpose processors (e.g., Intel® Pentium® processor(s), Advanced Micro Devices Athlon® processor(s), or the like), one or more special purpose processors, one or more application specific integrated circuits (ASICs), or the like. The memory 412 may comprise volatile and/or non-volatile memory. The computer-readable storage media 416 may comprise one or more hard discs, optical storage media, Flash storage media, and the like.

The device 400 may include a communications interface 450, which may communicatively couple the device to one or more networks, such as the network 140 of FIG. 1, the Internet, a WAN, a LAN, a local-cluster network, or the like. The communications interface 450 may comprise wired and/or wireless communications interfaces, such as Ethernet interfaces, fiber-optic interfaces, IEEE 802.11 interfaces, and the like. One or more of the communications interfaces 452 may be communicatively coupled to a communications network 440, which may comprise a WAN and/or the Internet. In some embodiments, the communication interface(s) 120A may be communicatively coupled to the communications network via a cluster interface 420.

One or more communications interfaces 454 may be communicatively coupled to an internal network 430 (e.g., LAN, local network, home network, or the like), such as the organization network 130 of FIG. 1. The communications interface(s) 454 may be communicatively coupled to the internal network 430 via a communications interface 122, which may comprise a switch, router, or other network element.

One or more communications interfaces 456 may be communicatively coupled to a local cluster network, which may provide for communications with other cluster devices (not shown), such as the devices 112, 114, and 116 in the cluster 110 of FIG. 1. Accordingly, the communications interfaces 456 may be communicatively coupled to a switch, hub, router, or other concentrator device 424.

The device 410 may include one or more processing modules 460, 462, 464 and 466, which may be operable on the processor 412 and/or implemented (in whole or in part) using one or more special purpose processing elements (e.g., special purpose processors, ASICs, or the like). Portions of the modules 460, 462, 464, and/or 466 may be implemented on the processor 412 using one or more computer-readable instructions stored on the computer-readable storage media 416.

A flow assignment module 460 may be configured to assign network flows to the devices in the cluster (e.g., using a method, such as method 500 described below). For example, when operating as a cluster master, the device 410 may receive inbound network traffic from the interface 420. The traffic may be routed to the flow assignment module 450, which may identify a flow associated therewith.

The traffic processing module 462 may process network traffic according to a security policy and a local, flow assignment data structure 463. The security policy enforced by the traffic processing module 462 may be defined in the cluster policy data structure 470, and may specify, inter alia, how various types of network traffic and/or network flows are to be processed (e.g., allowed or not allowed, filtered, routed, and so on). For example, a security policy may determine which types of network traffic may be passed from an external network (e.g., coupled to interface 420) to an internal, organization network (e.g., coupled to interface 422), and vice versa, may define network filtering tasks, define firewall rules, and so on.

In some embodiments, the network security policy defined in the cluster policy data structure 470 may define a role-based, user-based, or other type of network security policies. For example, the cluster configuration 470 may reference and/or provide a link to a network authentication or authorization server (not shown), which may be used to provide user- and role-based security services. Accordingly, in some embodiments, the traffic processing module 462 may be communicatively coupled to one or more external servers (not shown), from which security policy information may be obtained. Alternatively, or in addition, such security policy information may be cached within the cluster configuration 470 and/or updated by the device acting as the cluster master.

The traffic processing module 462 may maintain a local, flow assignment data structure 463 identifying the network flows that have been assigned thereto. The identifying may comprise information to allow the traffic processing module 462 to associate network traffic with an assigned flow (e.g., based upon source address, destination address, protocol, port, security information, and so on). Unlike the flow assignment data structure 472 maintained by a cluster master that provides information regarding all the network flows handled throughout a cluster, the data structure 463 may identify only the flows that have been assigned to the particular device 410. When the cluster master assigns a flow to the device 410, the traffic processing module 462 may update the local, flow assignment data structure 463. The data structure 463 may also be used to manage local, run-time synchronization data associated with the flows assigned to the device 410.

The cluster configuration data 470 may also include information identifying each of the devices within the cluster, identifying the static roles of each of the cluster devices (e.g., active, standby, etc.), indicate a current state of each of the cluster devices (e.g., active, standby, failed, etc.), provide cluster licensing information, and so on. As will be discussed below, when the device 410 is operating as the cluster master, the device 410 may be configured to synchronize the cluster configuration data 470 to the other cluster devices. Therefore, the cluster master (device 410) may act as the "source" of cluster configuration data for the other cluster devices. When changes to the cluster configuration are made (e.g., via a configuration interface, policy server, or the like), the cluster master (device 410) may be configured to synchronize the changes to the other cluster devices (e.g., cause the other cluster devices to update their respective cluster configuration data structures 470).

When operating as the cluster master, the device 410 may be responsible for managing the workload of the cluster. Accordingly, the cluster master (device 410) may be configured to assign processing tasks, such as handling network flows, to various active cluster members. The cluster master device 410 may maintain a flow assignment data structure 472, which may provide a mapping between the network flows being handled by the cluster, and the cluster devices assigned thereto.

When the cluster master (device 410) receives network traffic that is not associated with a known flow and/or is associated with a flow that is not being actively handled by a cluster device (according to the flow assignment data structure 472), the flow assignment module 460 may assign the flow to a cluster device. Assigning a flow to a cluster device may comprise selecting a cluster device according to a set of flow assignment rules and/or other criteria (e.g., device health, device availability, etc.) After selecting a cluster device to handle a particular flow, the flow assignment module 460 may update the flow assignment data structure 472 accordingly. The cluster master may also configure the selected cluster device to begin processing the flow (e.g., transmit a message via a cluster communication interface 456 to configure the selected device to begin processing the network flow). In addition, when the cluster is operating in direct-forward mode, the flow assignment module 460 (or the device assigned to handle the flow) may configure the interface 420 to route traffic associated with the flow directly to the device assigned thereto.

The cluster devices that are actively processing network flows may be configured to transmit flow, run-time synchronization data to the cluster master. The cluster master (device 410) may aggregate the flow, run-time synchronization data into data structure 474 comprising all of the flow, run-time synchronization of all the cluster devices. The flow, run-time synchronization data may include information needed to handle the corresponding network flow (e.g., session information, state information, security keys, sequence number, etc.). The flow, run-time synchronization data may be transmitted to the device 410 via the cluster communication interface(s) 456 or another interface 452 or 454. When acting as a cluster master, the device 410 may be configured to maintain the flow, run-time synchronization data to provide for flow failover between cluster devices. As discussed above, when a cluster device fails, the flows assigned thereto may be transitioned to another replacement cluster device. In the transition, the flow, run-time synchronization data corresponding to the transitioning flows may be transmitted to the replacement device, allowing the device to resume handling the flow with minimal disruption.

As discussed above, when a cluster device 410 is acting as a cluster master, the device 410 may manage shared cluster resources, such as address pools, port pools, and the like. The cluster master (device 410) may also provide shared services, such as a shared IKE module. The shared IKE module may provide callbacks to other cluster devices to negotiate security associations (P1SA, P2SA, and so on), shared keys, and the like. Information relating to the shared resources and/or shared services provided by the device 410 may be maintained in a shared resource data structure 476.

The cluster configuration data structure 470, flow assignment data structure 472, flow, run-time synchronization data structure 474, shared resource data structure 476, and any other data needed for cluster master failover, may be maintained in a global, run-time synchronization data structure 480. When operating as a cluster master, the device 410 may synchronize the global, run-time synchronization data structure 480 with other cluster devices (e.g., the backup master device). Synchronizing the data structure 480 may provide for replacement of the cluster master by another cluster device (e.g., the backup master device (not shown)), in the event of a failover.

Accordingly, when the device 410 is operating as a backup master, the device 410 may be configured to receive the global, run-time synchronization data structure 480 (comprising cluster configuration 470, the flow assignment data structure 472, the flow, run-time synchronization data 474, the shared resource data structure 476, and any other relevant data) from the cluster master.

The cluster master (device 410) may be configured to synchronize the cluster configuration data structure 470 to the other cluster devices. The traffic processing module 462 may use the cluster configuration data structure 470 to process network flows in accordance with the security policy defined therein. However, cluster devices other than the cluster master and backup master may not actively use the flow assignment module 460 and/or may not maintain the flow assignment data structure 472, flow, run-time synchronization data structure 474, and/or shared resource data structure 480, since these structures are not needed for flow processing. In some embodiments, however, the modules (460, 464, and 466) and data structures (472, 474, and 476) may exist in skeleton form to provide for an efficient transition to a cluster master and/or backup master role within the cluster when needed.

A monitoring and failover module 464 may be used to monitor cluster devices as described above in conjunction with FIGS. 3C and 3D. Each cluster device 464, whether operating in the cluster master, backup master, active, or standby role, may implement the monitoring and failover module 464. The monitoring and failover module 464 may be configured to generate and transmit status messages from the device 410, which, as discussed above, may comprise a health score of the device. The module 464 may also be configured to receive status messages from other cluster devices. Information relating to the health score of the device 410, as well as status information relating to other cluster devices may be maintained in a monitoring and failover data structure 478.

When operating as the cluster master, the device 410 may be configured to provide for device failover within the cluster. For example, when a device handling a particular set of flows fails, the processing tasks assigned thereto may be transitioned to other cluster devices. The monitoring and failover module 464 may be configured to determine when a failover operation is needed (according to failover criteria, and as discussed above in conjunction with FIG. 3C). When a device for failover has been identified, the monitoring and failover module 464, along with the flow assignment module 460, may assign the tasks of the failed over device to one or more replacement devices (as described above in conjunction with FIG. 3D). The flows may be transitioned to existing, active cluster devices and/or to standby cluster devices that have been activated responsive to the failure. When the new device(s) are selected, the flow, run-time synchronization data 474 associated therewith may be sent to the corresponding replacement devices, which may use the data to resume handling the flows.

If the device being failed over is operating as the backup master, failover may additionally include selecting a new device to act as the backup master (e.g., based upon device health score, address, or the like) as described above. After the backup master is selected, the cluster master may be configured to synchronize the global, run-time synchronization data structure 480 to the new backup master device.

If the device being failed over is operating as the cluster master, a new cluster master may be selected as described above (e.g., as the backup master, based upon health score, or the like). The global, run-time synchronization data structure 480 may be populated from the backup master and/or failed over cluster master (if available).

When operating as cluster master, the device 410 may comprise a cluster management module 466, which may be used to synchronize the cluster configuration data structure 470 to other cluster devices (not shown), join new devices to the cluster (as described above in conjunction with FIG. 2B), determine and maintain the licensed capabilities of the cluster, and so on.

As discussed above, when a new computing device (not shown) is communicatively coupled to a cluster network interface 420, 422, and/or 424, the device may be discovered by other cluster devices. Discovery may comprise a cluster device (e.g., the cluster master device 410) transmitting one or more discovery messages (e.g., broadcast, multicast, or other message types) on one or more of its communications interfaces 450. The discovery messages may be sent automatically (e.g., periodically, until a device is discovered). In some embodiments, the periodic status messages transmitted by the monitoring and failover module 464 may be configured to also serve as discovery messages. Alternatively, the discovery messages may only be transmitted upon receiving a discovery command (or other command). The configuration command may be received via one or more of the communications interfaces 450 and/or a configuration interface 467 (discussed below). In some embodiments, the device 410 may discover a new computing device passively (e.g., by monitoring traffic on the interface 420, 422, and/or 424, by inspecting routing and/or ARP information, or the like).

When a new computing device is discovered, the cluster manager module 466 of the cluster master device 410 may be configured to initiate a cluster join procedure to add the new device to the cluster as described above in conjunction with FIGS. 2A and 2B. The cluster management module 466 may be configured to access device-identifying information of the new computing device (e.g., by interrogation, passive monitoring, or other means). Using the device-identifying information, the cluster management module 466 may determine whether the discovered computing device is eligible to join the cluster (e.g., based upon hardware, software, firmware, licensing, or other information about the device). If the computing device is eligible to join the cluster (e.g., is compatible with the other devices in the cluster, is licensed for cluster operation, and so on), the cluster management module 466 may determine a device-specific configuration for the new device, and transmit the device-specific configuration thereto. The device-specific configuration may include the cluster configuration data 470, including identifiers of the cluster devices, cluster addressing information, and the like. The device-specific configuration may also include a role assignment specifying the static role of the new computing device in the cluster, provide device-specific addressing and port assignment information, provide one or more device-specific shared keys for secure cluster communications, and so on. After the transmission, the cluster management module 466 may verify that the new computing device implemented the device-specific configuration (e.g., by a confirmation message, active interrogation, network inspection, or the like). If the new computing device fails to implement the device-specific and/or cluster configuration, the new computing device may be excluded from the cluster.

When the cluster management module 466 verifies successful implementation of the device-specific and/or cluster configuration, the device may be joined to the cluster (e.g., added to the cluster configuration data 470, which is synchronized with other cluster devices). Joining may comprise providing the new computing device with a shared key (or performing a key exchange protocol) to allow the device to securely communicate with other cluster devices. Upon joining the cluster, the new computing device may then begin performing its assigned role (e.g., be assigned cluster processing tasks, receive cluster synchronization data, and the like).

The cluster management module 466 of a device 410 operating as the cluster master may also be configured to determine the licensed capabilities of the cluster. Information defining the licensed capabilities of the cluster may be included in the cluster configuration data structure 470, which is synchronized to, and implemented by, the other cluster devices. In some embodiments, the licensed capabilities of the cluster may be defined in a single cluster license. Alternatively, the licensed capabilities of the cluster may be determined by combining the licenses of two or more cluster devices. As discussed above, the combination may be made in a number of different ways, including, but not limited to: a "least capabilities" combination, an additive combination, a logical OR combination, a selective combination (e.g., different combination types of for different licensed features), or the like.

The cluster management module 466 may use the licensing information to assign static roles to cluster members (as devices are joined to the cluster, as the cluster configuration changes, and so on). For example, devices that do not have their own license may be assigned a static role of "secondary" or standby. Devices that are appropriately licensed may be eligible to be assigned a static role of "primary" or active. In some embodiments, the licensed capabilities of the cluster (defined in a single cluster license, or by combining two or more cluster device licenses) may determine cluster configuration. For instance, if the licensed capabilities of the cluster provide for five active devices, new computing devices may be added to the active role (up to five) regardless of their individual licenses. However, once five active devices are in the cluster, additional devices may be assigned to standby, even if the devices have individual cluster licenses.

In some embodiments, the cluster management module 466 may provide a configuration interface 467, which may comprise a network accessible user interface, an Application Programming Interface (API), an SNMP client, a telnet server, a serial communications interface, a parallel port interface, or the like. Accordingly, in some embodiments, the configuration interface 467 may comprise and/or utilize one or more of the communications interfaces 450 (e.g., the communication interfaces 454 communicatively coupled to an internal, or organization network). Alternatively, or in addition, the configuration interface 467 may comprise one or more human-machine-interaction (HMI) components (not shown), such as a display, keyboard, mouse, or other input/output devices.

The configuration interface 467 may allow a human operator, policy manager, or other configurator to interrogate and/or change the configuration of the cluster. When the device 410 is operating as a cluster master, the configuration interface 467 may be capable of displaying and/or modifying the configuration of the cluster as a whole. Accordingly, the configuration interface 467 may be capable of displaying the configuration of all of the computing devices in the cluster, including the health score and other performance indicators thereof, may be capable of setting configuration parameters of all of the computing devices in the cluster, and so on.

In some embodiments, the configuration interface 467 may implement a "single-device" paradigm, in which the cluster is viewed and managed as a single device. Accordingly, configuration changes made to one cluster device (the cluster master device 410), may be transparently synchronized to other cluster devices (by the cluster management module 466). However, per-device configuration changes may be accessible by interrogating individual cluster devices (e.g., to apply device-specific licensing parameters, view device-specific information, such as health score and the like, and so on).

The cluster management module 466 (along with the configuration interface 467) may provide for efficient cluster updating and maintenance. For example, a command to upgrade or modify the cluster configuration may be received via the configuration interface 467. The upgrade or modification may require that the devices in the cluster be taken down (e.g., may include a change to device software, firmware, and/or hardware). Responsive to such a request, the cluster management module 466 may implement a cluster upgrade operation in which cluster devices are taken down in an orderly fashion such that the services provided by the cluster are not significantly impacted.

In one example, the cluster management module 466 may be configured to upgrade or modify cluster standby devices first. If the cluster includes two or more standby devices, the upgrade or modification of may be done such that one or more of the standby devices is available during the upgrade. For example, if there are three standby devices A, B, and C, the cluster management module 466 may configure device A to be upgraded first, while keeping the B and C devices up and then, after the A device is running again, upgrade device B while devices A and C are kept up, and so on.

The cluster management module 466 may then perform a similar upgrade process on the active cluster devices; the cluster management module 466 may be configured to upgrade the active cluster devices sequentially, taking down only one (or some other subset) of the active devices at a time. As each active device is upgraded or modified, it may be failed over to another active device and/or to a standby device if available.

The cluster management module 466 may then be configured to perform the modification to the cluster backup master device. The backup master may be failed over to another cluster device before being modified (in a failover operation as described above). A replacement backup master may continue operating as the backup master even after the former backup master has been modified. The selection of the backup master may be made according to a selection criteria as discussed above (e.g., based upon health score, resources, hardware capabilities, or the like).

After modifying the backup master, the cluster management module 466 may be configured to modify the cluster master device itself. Modifying the cluster master device may comprise failing over the cluster master to another cluster device (e.g., the replacement backup master or another cluster device). After completing the cluster master failover operation (e.g., and selecting a new cluster master), the device 410 may be upgraded and rejoined to the cluster. The device 410 may resume acting as the cluster master (e.g., by failing over the temporary cluster master selected above) and/or may resume operation in another role within the cluster (e.g., as a backup master, active, or standby cluster device).

Figure 5:
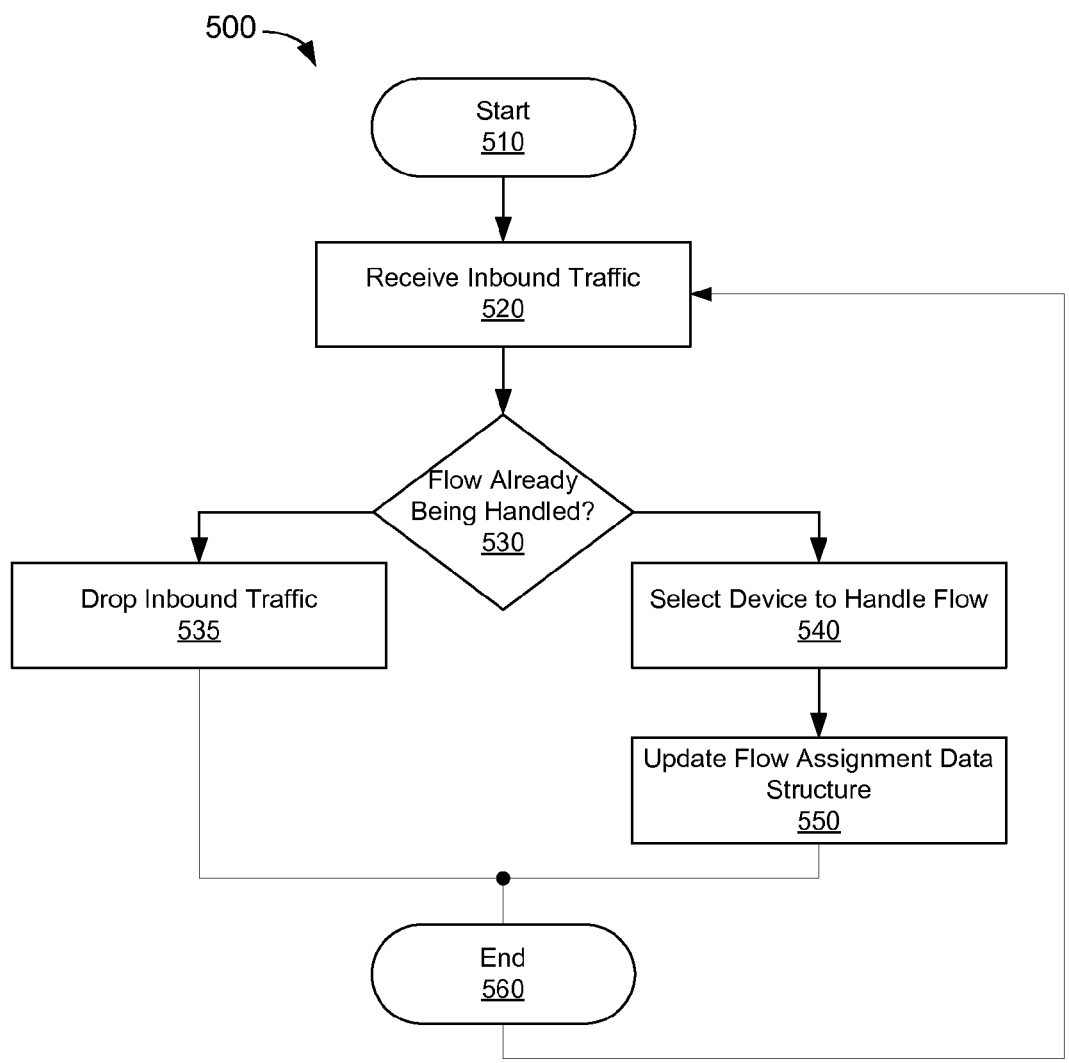
FIG. 5 is a flow diagram depicting one embodiment of a method for assigning a flow to a cluster device.

FIG. 5 is a flow diagram of one embodiment of a method for assigning processing tasks, such as network flow processing, in a cluster, such as the cluster 110 of FIG. 1. The method 500 may be implemented on a computing device, such as the device 410 of FIG. 4. The method 500 may be implemented using one or more computer-readable and/or computer-executable instructions. The instructions comprising the method 500 may be implemented as one or more distinct software modules, which may be stored on a computer-readable storage medium, such as a hard disc, optical storage media, memory, or the like. In some embodiments, one or more steps of the method 500 may be tied to particular machine components, such as computer-readable storage media, communications interfaces, processing modules, or the like.

At step 510, the method 500 may start and/or be initialized. Initializing the method 500 may comprise loading one or more computer-readable instructions from one or more computer-readable storage media, accessing and/or initializing one or more communications interfaces, and the like.

At step 520, network traffic may be received. The network traffic may have been received via a network interface (e.g., interface 120 and/or 122 of FIG. 1), such as a hub, switch, router, concentrator or the like. If the cluster of method 500 is operating in "flooding" mode, the traffic may be received by all of the devices in the cluster. If the cluster is operating in "direct forwarding" mode, the traffic may be received only by the cluster master device (or the device configured to handle the flow).

At step 530, the cluster master may determine whether the network traffic is associated with a known flow (e.g., a flow that is being handled by one of the devices in the cluster). Step 530 may comprise looking up the flow in a flow assignment data structure, such as a table, index, or the like. The flow assignment data structure may provide a mapping between network flows and the cluster devices assigned thereto. In the data structure, a flow may be identified based upon a source address thereof (IP address, MAC address, or the like), flow protocol, flow port, flow security information, or the like. The cluster device assigned to the flow may be identified according to a cluster-specific identifier, MAC address, cluster address (e.g., address of a cluster interface port of the device), IP address, or the like. In some embodiments, the flow assignment data structure may further comprise flow, run-time synchronization data pertaining to the flow, which may include, but is not limited to: flow security association data (P1SA, P2SA), shared key data, user-session data, flow cache, and the like. Alternatively, or in addition, the flow assignment data structure may include a reference (link, pointer, or the like) to the flow, run-time synchronization data associated therewith.

If at step 530, the method 500 determines that there is no device assigned to handle the flow (e.g., there is no entry for the flow in the flow assignment data structure, the device identifier associated with the flow entry has not been set, the device that was handling the flow has been failed over, or the like), the method 500 may continue at step 540; otherwise, if a device is already actively handling the flow, the method 500 may continue at step 535.

At step 535, since the network traffic is associated with a flow that has already been assigned to a device in the cluster that is actively handling the flow (e.g., has not failed), the traffic may be ignored by the method 500. Accordingly, the method 500 may terminate at step 560 and/or may continue at step 520 when additional network traffic is received.

At step 540, the method 500 may select a cluster device to handle the flow. Selecting a cluster device may comprise identifying which devices in the cluster are eligible to handle the flow (e.g., are active, based upon flow assignment rules discussed below, and so on), evaluating a load and/or health of the devices in the cluster, and the like. In some embodiments, the cluster master and/or master backup devices may be available to handle network traffic flows. Alternatively, the cluster master and/or backup master may be dedicated to managing the state of the cluster and not processing network traffic flows. Eligibility of a cluster device to handle a particular flow may be based upon one or more flow assignment rules (discussed below). The flow assignment rules may determine eligibility based upon whether another cluster device has already been assigned a network flow that is related to the new network flow, shares security information with the new network flow, or the like. If two or more cluster devices are eligible to handle the new network flow, the selection of step 540 may comprise evaluating a selection criteria to select one of the two or more devices. The selection criteria may be based upon device health score, processing load, random (e.g., round robin), or some other metric.

At step 550, the flow assignment data structure may be updated to reflect the assignment. At step 550, if the cluster is operating in direct forward mode, the cluster interface may be configured to forward the flow traffic directly to the device assigned to handle the flow (e.g., using a direct forward request or other configuration message).

At step 560, the flow may terminate and/or may continue at step 520 when additional network traffic is received.

As discussed above, assigning a flow to a device may comprise determining whether which devices are eligible to handle the flow and/or evaluating one or more flow assignment rules. A device may be eligible to handle a flow if the health score of the device indicates that handling the flow would not cause the device to become unstable, perform poorly, adversely affect quality of service (QoS) for other flows handled thereon, or the like. Similarly, a flow assignment rule may determine which devices are eligible to handle a particular flow based upon other flow assignments. For example, a flow assignment rule may specify that all flows that use the same tunnel go through the same cluster device. Consolidating flows in this manner may provide for protection against anti-replay attacks and facilitate dead peer detection (DPD).

FIG. 6A is a block diagram illustrating one example of related flow assignment in which related forward and reverse flows are assigned to the same cluster device. In the FIG. 6A example, forward and reverse flows 681 and 682 are established between a computing device 633 within an organization 630 and a computing device 646 in the network 640. The cluster master device (device 612) may implement a flow assignment rule that assigns related forward and reverse flows to the same cluster device. Accordingly, in the FIG. 6A example, both of the flows 681 and 682 may be assigned to device 2 614. Alternatively, the flows 681 and 682 could be assigned to another device 612, 614, or 616. The flow assignment rule may prevent the flows 681 and 682 from being assigned to different devices (e.g., flow 681 being assigned to device 614 and flow 682 being assigned to device 616, and so on).

FIG. 6B is a block diagram depicting another example of related flow assignment in which related flows are assigned to the same cluster device. The related flows 681, 682, 683, and 684 depicted in FIG. 6B may be related to one another (e.g., may be the data and control channels of a file transfer protocol (FTP) connection, may be related to the same voice over IP connection (VOIP), or the like). A flow assignment rule may specify that all of the related flows are to be assigned to the same cluster device. As shown in FIG. 6B, related flows 681, 682, 683, and 684 may be established between a computing device 633 in the organization network 630 and an external computing device 646. According to the flow assignment rule, all of the flows 681, 682, 683, and 684 may all be assigned to the same device (device 2 614). Alternatively, the flows 681, 682, 683, and 684 may all be assigned to another device (612, 616, or 618). The flow assignment rule may prevent the flows 681, 682, 683, and/or 684 from being split up between different devices in the cluster (e.g., prevent flows 681 and 682 from being assigned to device 2 614 and flows 683 and 684 being assigned to device 3 616, and so on).

FIG. 6C is a block diagram depicting an example of security flow assignment, in which flows associated with the same tunnel are assigned to the same cluster device. In the FIG. 6C example, a tunnel 680 (e.g., an SSH tunnel, or the like) may be established between a computing device 633 in the organization network 630 and a computing device 646 in the network

640. The tunnel 680 may comprise one or more flows 681, 682, 683, and 684. The flow assignment rule may specify that all of the flows 681, 682, 683, and 684 of the tunnel 680 are assigned to the same cluster device (device 2 614). Accordingly, the flow assignment rule may prevent the tunnel 680 flows 681, 682, 683, and 684 from being split up between the devices 612, 614, 616, and/or 618.

Figure 6D:
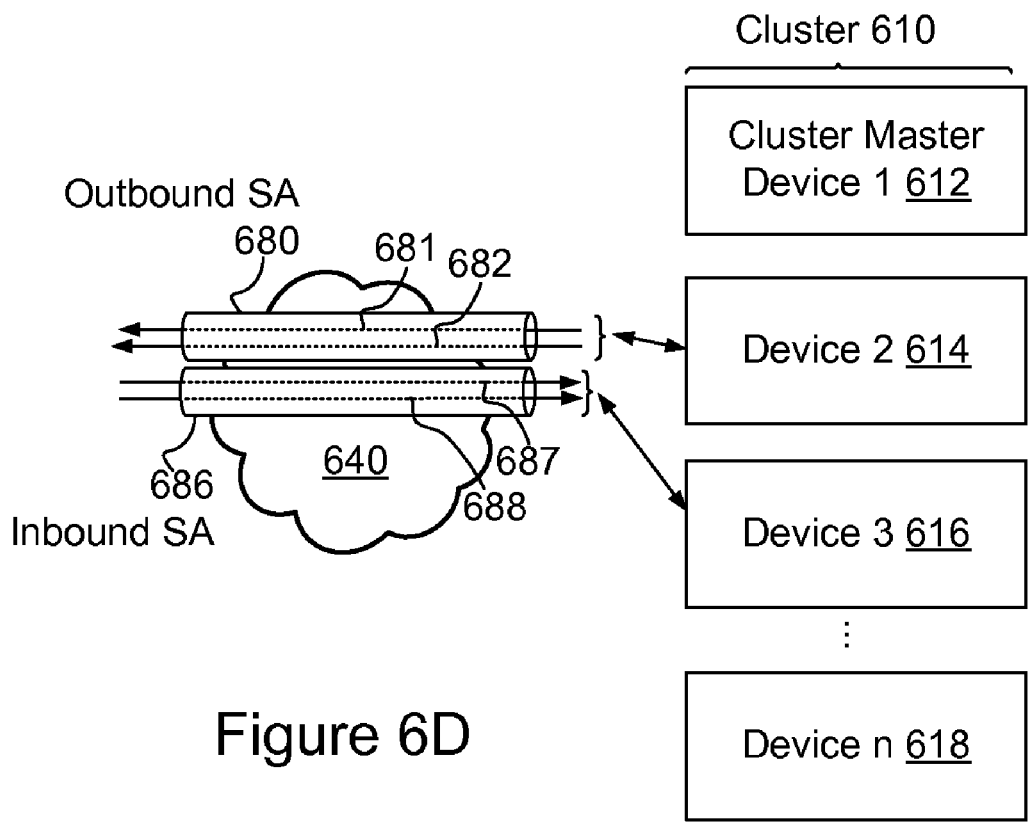
FIG. 6D is a block diagram depicting another example of security flow assignment, in which flows associated with the same inbound or outbound security association are assigned to the same cluster device, whereas the inbound and/or outbound tunnel flows may be assigned to different cluster devices.

FIG. 6D is a block diagram illustrating another example of security flow assignment in which flows associated with the same inbound or outbound security association are assigned to the same cluster device, whereas the inbound and/or outbound tunnel flows may be assigned to different cluster devices. As shown in FIG. 6D, flows 681 and 682 use the same outbound SA 680 and flows 687 and 688 use the same inbound security association. Accordingly, the flow assignment rule may specify that the flows 681 and 682 are assigned to the same device (device 2 614), and the flows 687 and 688 are assigned to the same device (device 3 616). The flow assignment rule illustrated in FIG. 6D may prevent the flows 681 and 682 from being assigned to different cluster devices and/or prevent the flows 687 and 688 from being assigned to different cluster devices.

Figure 6E:
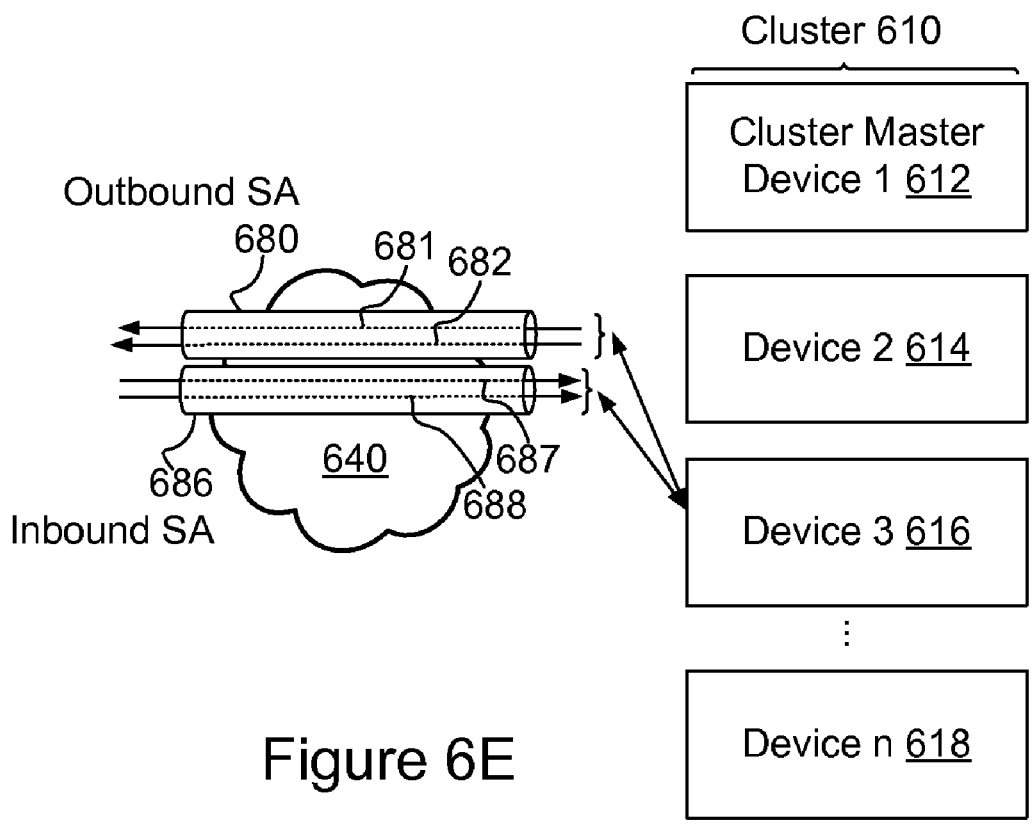
FIG. 6E is a block diagram depicting another example of security flow assignment, in which flows related to the same security association (inbound and outbound) are assigned to the same device.

Alternatively, a flow assignment rule may specify that all of the inbound and outbound flows associated with a particular security association be assigned to the same device. FIG. 6E shows an example of this type of flow assignment. As shown in FIG. 6E, the flows 681, 682, 687 and 688 are all assigned to the same device (device 3 616). The flow assignment illustrated in FIG. 6E may prevent the flows 681, 682, 687 and/or 688 from being split up across different cluster devices.

Figure 6F:
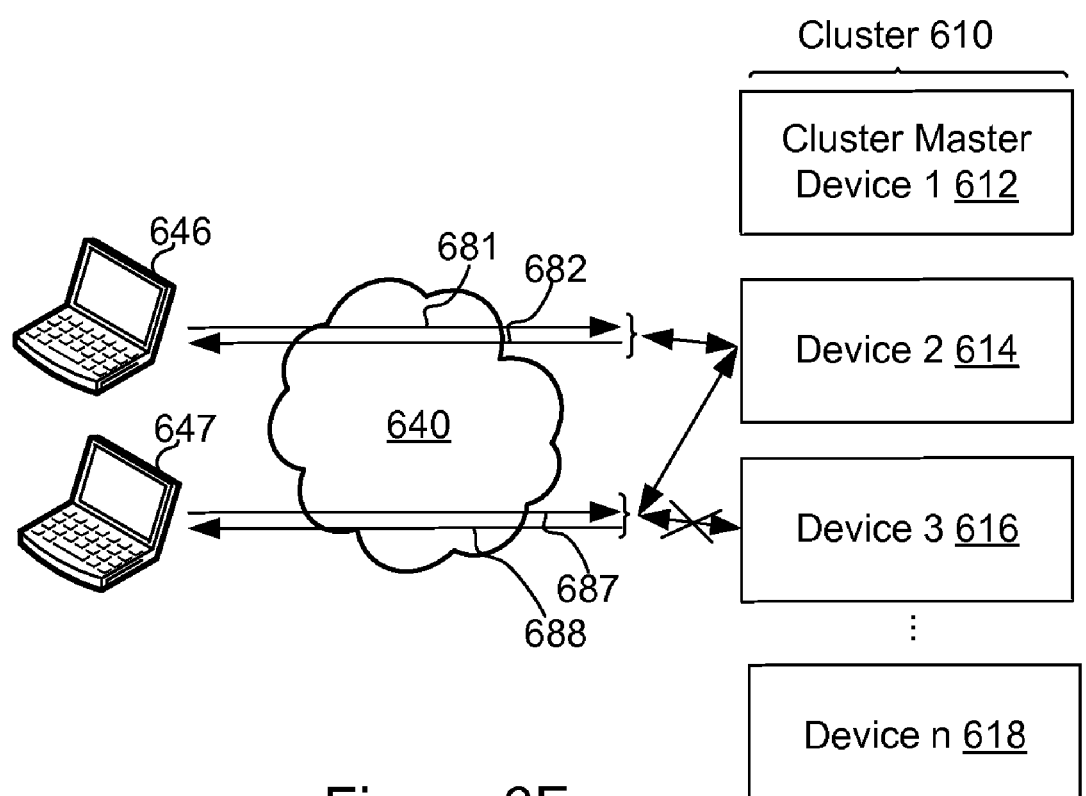
FIG. 6F is a block diagram depicting another example of related flow assignment, in which the flows related to a tunnel switch are assigned to the same device.

A cluster according to the teachings of this disclosure may be configured to provide tunnel switching (e.g., provide for communication between two or more remote peers). When used for tunnel switching, the cluster master device may implement a flow assignment rule configured to specify that the flows associated with the tunnel switch connection be handled by the same cluster device. A restriction rule of this type may reduce cluster communication traffic (e.g., prevent tunnel switch data from being transferred between cluster devices). FIG. 6F is a block diagram that illustrates another example of a related flow assignment in which the flows associated with the same tunnel switch are assigned to the same device. In the FIG. 6F example, remote peer devices 646 and 647 establish a tunnel switch with the cluster 610. The flows 681 and 682 may be associated with the remote peer 646, and the flows 687 and 688 may be associated with the remote peer 647. The flows 681, 682, 683, and 684 may be used to implement a tunnel switch between the remove peers 646 and 647 (e.g., provide for peer-to-peer communication therebetween). The cluster master device 612 may identify the flows 681, 682, 687, and 688 as forming a tunnel switch (e.g., based upon addressing, protocol, and other information associated therewith) and may implement a flow assignment rule configured to assign the flows 681, 682, 687, and 688 to the same cluster device (e.g., device 2 614). Accordingly, all of the flows comprising the tunnel switch (681, 682, 687, and 688) may be assigned to device 2 614. The flow assignment rule may prevent the flows from being spread to other devices (e.g., prevent flows 681 and 682 from being handled by a first device (device 2 614), while flows 687 and 688 are handled by a second device (device 3 616)).

Additional flow assignment rules may be imposed when dealing with IP security tunnels (IP Sec). A single cluster device may be configured to establish an IPSec tunnel using an IPSec module, which may be implemented as a kernel module of the device (e.g., in a kernel module of the traffic processing module 462 of FIG. 4). The IPSec module may be communicatively coupled to an IKE module, which may be used to perform key exchange operations used to setup an IPSec session and/or tunnel. In some embodiments, the IKE module may be implemented as a user space process (e.g., a user space process of the traffic processing module 462). For example, the IKE module may be configured to create Phase II Security Associations (P2SA) for use by the IPSec kernel module. The IPSec module, while handling traffic on the IPSec tunnel managed thereby, may periodically request key updates from the IKE module (for a rekey operation), for dead peer detection, as well as termination of a IPSec session or tunnel.

Figure 7:
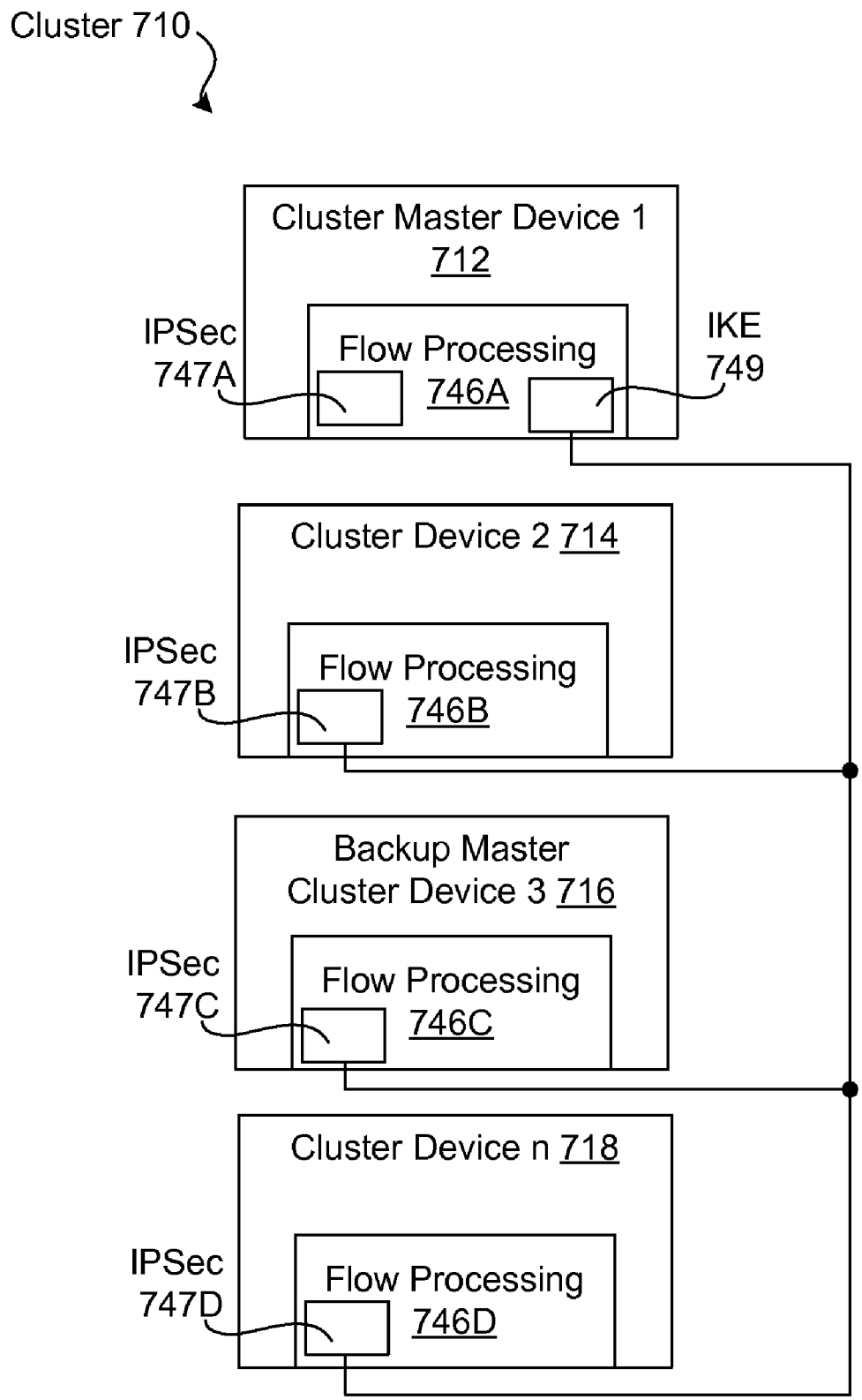
FIG. 7 is a block diagram illustrating one embodiment of a cluster comprising a shared Internet Key Exchange module.

FIG. 7 is a block diagram of one example of a cluster 710 comprising a single IKE. The cluster 710 includes a single IKE 749 to which each of the IPSec modules 747A, 747B, 747C, and 747D of the cluster devices 712, 714, 716, and 718 are linked (e.g., via respective cluster interface ports (not shown) communicatively coupled to a network device, such as a router, switch, concentrator, or the like). Only the IKE 749 of the cluster master (device 712) may be active. The other devices 714, 716, and/or 718 may include an IKE module (not shown), which may be activated in the event the device is elected to operate as the cluster master. Accordingly, only the IKE 749 of the cluster master 712 may perform IKE key exchanges with peer computing devices (not shown). The IKE 749 may perform all IKE operations for the other cluster devices 714, 716, and 718 including, but not limited to: P1SA negotiations, P2SA negotiations, rekey operations, dead peer detection, and the like.

The IKE 749 may generate P2SAs as needed by the cluster devices 714, 716, and/or 718 (e.g., in order to establish an IPSec tunnel between the device 714, 716, and/or 718 and an external peer). After generating a P2SA for a cluster device (e.g., device 714), the cluster master 712 may transmit the PS2A thereto. The cluster device may then handle the IPSec flow accordingly (e.g., using the P2SA generated by the IKE 749). In some embodiments, the cluster master 712 may implement a flow assignment rule, in which all flows that use a particular P2SA are assigned to a particular cluster device. For example, if the IKE 749 generates a particular P2SA for the cluster device 714, and the P2SA is subsequently used in another flow, the cluster master may be configured to assign the new flow to the cluster device 714 (the device that holds the particular P2SA). Similarly, when a flow is reassigned from a first cluster device (e.g., device 714) to a second cluster device (e.g., device 716), the PS2A and other IPSec information relevant to the reassigned flows may be transferred from the cluster master device 712 to the second device (device 716). Following the reassignment, subsequent flows that use the transferred P2SA may be assigned to the second device.

As shown in FIG. 7, each of the IPSec modules 748B, 748C, and 748D may be communicatively coupled to the IKE 749. As such, the IPSec modules 748B, 748C, and 748D may perform callbacks to the IKE 749 in order to maintain P2SA sequence number information, perform rekey operations, perform DPD (e.g., DPD hello operations), and the like. The communication link between the IPSec modules 748B, 748C, and 748D may be implemented using respective cluster interface ports of the devices 714, 716, and 718, which may provide for fast and efficient communications.

Since the IKE 749 maintains IPSec data for all of the devices in the cluster 710, the cluster master 712 may be capable of performing more granular load balancing (all of the devices in the cluster 710 use the same IKE 749 and, as such, the devices 712, 714, 716, and 718 may "appear" to external peers as a single device for the purposes of IPSec).

For example, IPSec tunnels (such as VPN tunnels or the like) may be assigned to different devices within the cluster 710. Therefore, although flows that use the same P1SA and/or P2SA information may be restricted to be handled by the same cluster device, other flows using different key security association information may be spread across the cluster 710 (e.g., the cluster device 714 may handle a first set of VPN connections, while the cluster device 716 handles a second set of VPN connections, and so on), including flows associated with the same peer. Moreover, IPSec security protocols, such as DPD, rekey, and the like may be implemented across all of the devices in the cluster 710.

Figure 8:
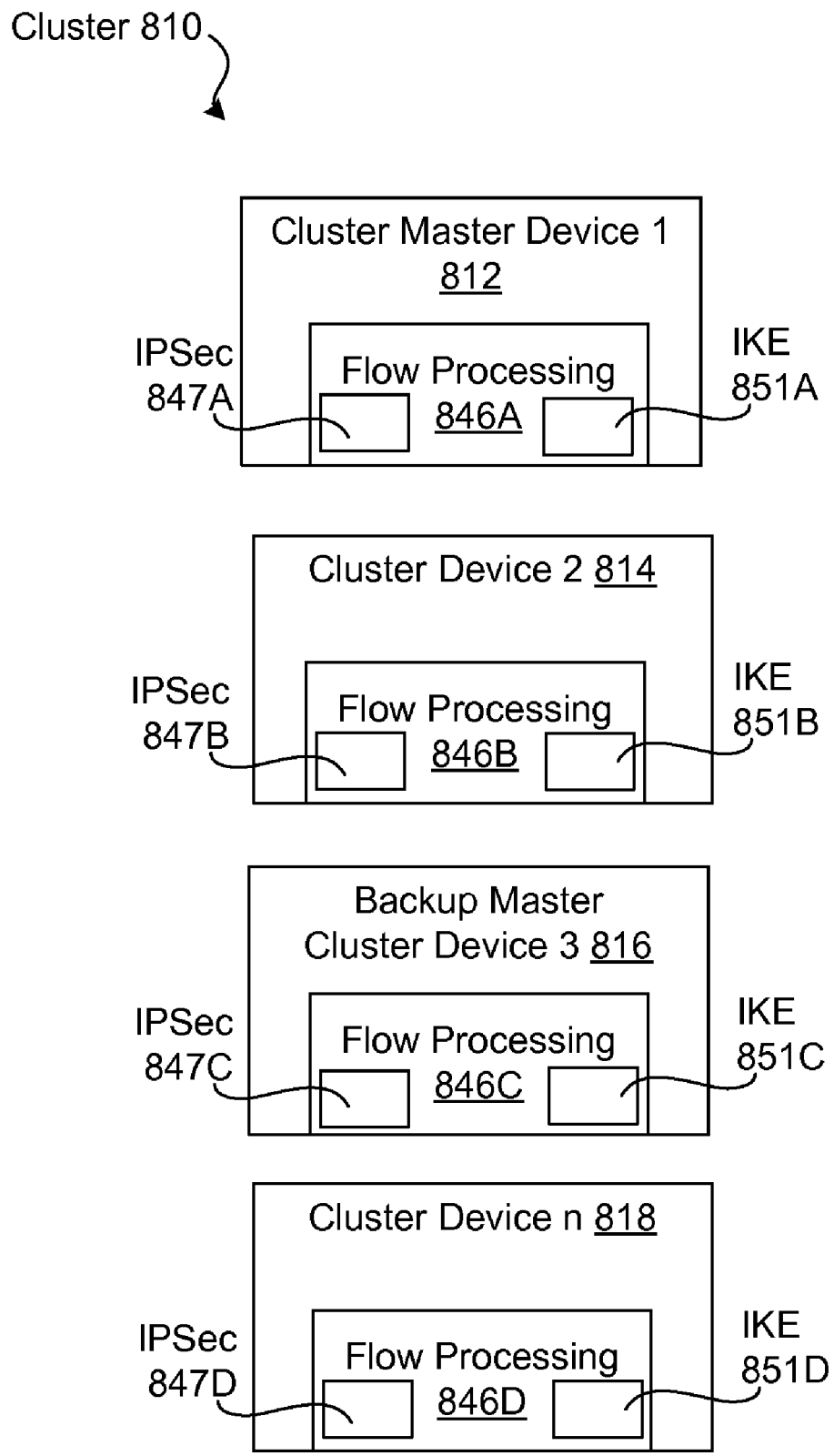
FIG. 8 is a block diagram illustrating one embodiment of a cluster comprising distributed Internet Key Exchange modules.

FIG. 8 is a block diagram depicting a distributed IKE approach. In the FIG. 8 example, each of the devices 812, 814, 816, and 818 in the cluster 810 may implement its own IKE module 851A, 851B, 851C, and 851D. Each IPSec modules 847A-847D communicates with its respective IKE 851A-851D. Accordingly, IKE information need not be transmitted between cluster devices. As shown in FIG. 8, the IPSec modules 847A-847D are not communicatively coupled to one another; however, the devices themselves (812, 814, 816, and 818) may be communicatively coupled for other reasons (e.g., the synchronize cluster configuration data, flow, run-time synchronization, global run-time synchronization data, and the like).

Since each cluster device 812, 814, 816, and 818 implements its own IKE 851A-851D, the devices may not appear to external peers as a "single device" as in the FIG. 7 example. Therefore, the cluster master 812 may implement a flow assignment rule specifying that all IPSec flows of a particular peer be assigned to the same cluster device 812, 814, 816, and/or 818.

Figure 9A:
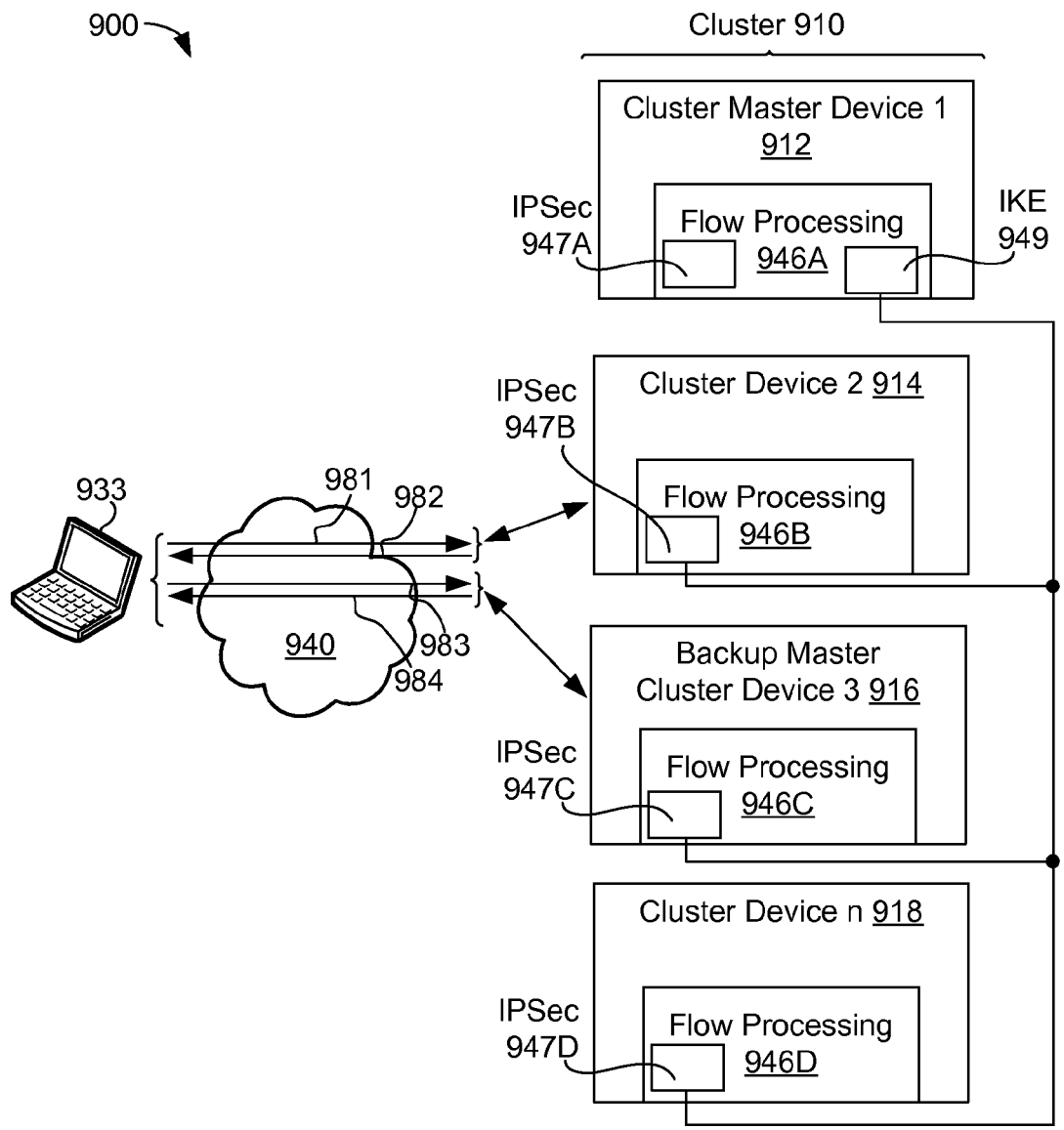
FIG. 9A is a block diagram depicting an example of flow assignment in a cluster comprising a shared Internet Key Exchange module.

FIG. 9A is a block diagram 900 depicting an example of flow assignment in a cluster comprising a shared IKE module (e.g., the cluster 710 of FIG. 7). In the FIG. 9A example, a remote peer 933 establishes IPSec flows 981, 982, 983, and 984 with the cluster 910. Since the IPSec modules 947A-947D of the cluster devices 912, 914, 916, and 918 use a common IKE 749 (of the cluster master device 912), the cluster 910 may appear to be a single device to the remote peer 933 for the purposes of IPSec (e.g., sequence number, rekey, DPD, etc.). Therefore, the cluster master device 912 may assign flows of the peer 933 to different cluster devices. The flows 981 and 982 (which may share a common P2SA) may be handled by the cluster device 914, and the flows 983 and 984 (which may share a different, common P2SA) may be handled by the cluster device 916.

Figure 9B:
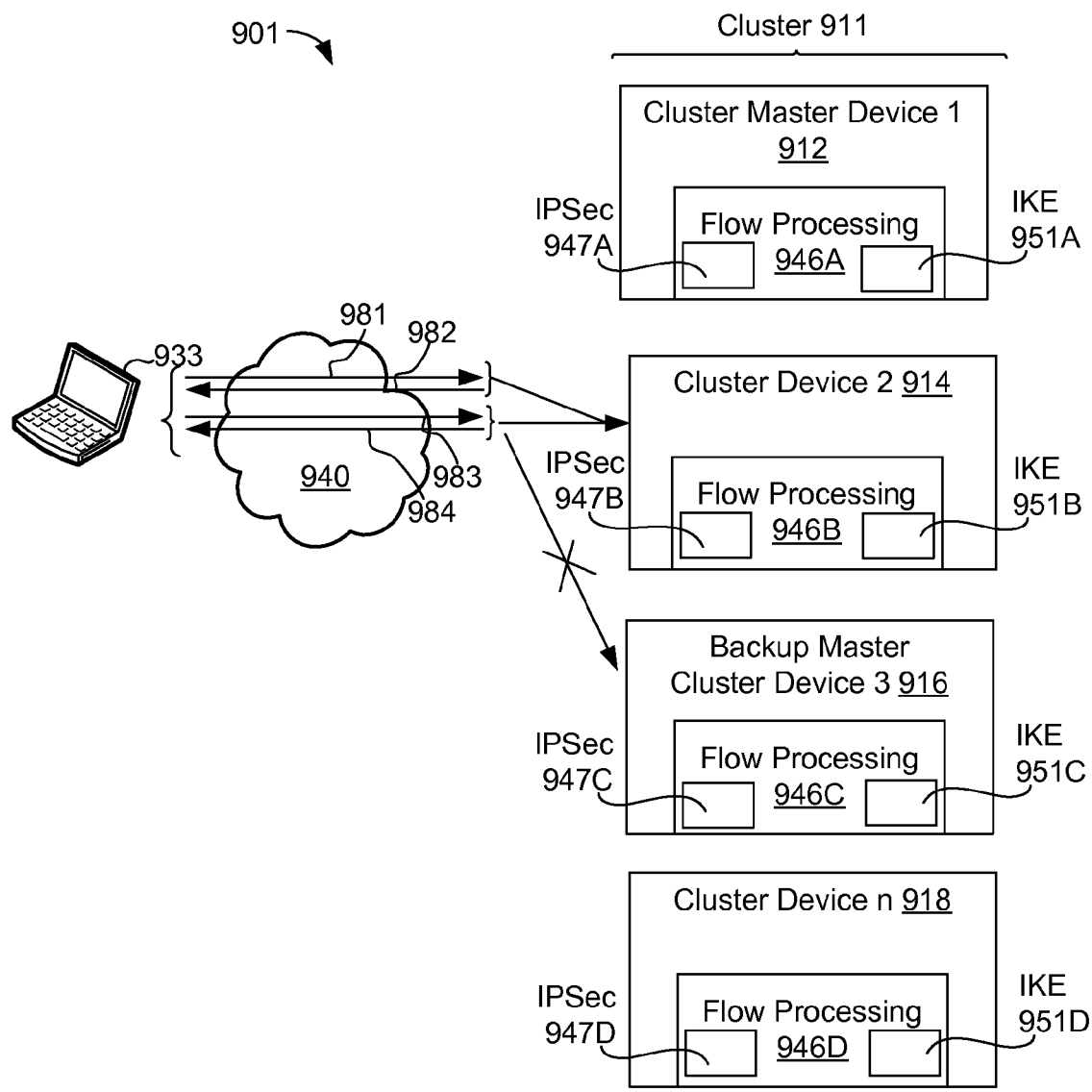
FIG. 9B is a block diagram depicting an example of flow assignment in a cluster comprising distributed Internet Key Exchange modules.

FIG. 9B is a block diagram 901 depicting an example of flow assignment in a cluster comprising distributed IKE modules (e.g., the cluster 810 of FIG. 8). As in FIG. 9A, a remote peer 933 establishes IPSec flows 981, 982, 983, and 984 with the cluster 911. The cluster 911 is configured to implement distributed IKEs and, as such, each of the cluster devices 912, 914, 916, and 918 implements its own IKE 951A-951D. Accordingly, the cluster devices may not appear as a single device to the peer 933 for the purposes of IPSec. Accordingly, the cluster master 912 may implement a flow assignment restriction rule specifying that all IPSec flows from the peer be handled by the same cluster device. As shown in FIG. 9B, all of the IPSec flows 981, 982, 983, and 984 are handled by the cluster device 914. According to the flow assignment restriction, the IPSec flows of the peer 933 may not be spread across the cluster devices (e.g., if the device 914 is handling flows 981 and 982, the device 916 may not handle flows 983 and/or 984).

A cluster according to the teachings of this disclosure may be configured to provide multiple wide area network VPN configurations. Each WAN may have a respective local and remote gateway pairings that may be failed over to one another. The local/remote gateway pairs may be defined in an IKE policy (which may be part of a cluster configuration, security policy, or the like). A flow assignment rule may be implemented to assign all flows associated with a particular IKE policy to the same cluster device (e.g., each cluster device may be responsible for a different, respective IKE group policy). Alternatively, the cluster master (or other device) may implement a plurality of shared IKE modules, one IKE per IKE group policy. Referring to FIG. 7, the cluster master device 712 may implement multiple IKE modules 749; one for each IKE group policy. The IPSec modules 747A-747D of the cluster devices 712, 714, 716, and 718 may be configured to synchronize IKE data with each of the respective IKE modules, on a per-flow basis (e.g., may select the IKE associated with the IKE group policy of a particular flow).

Figure 10:
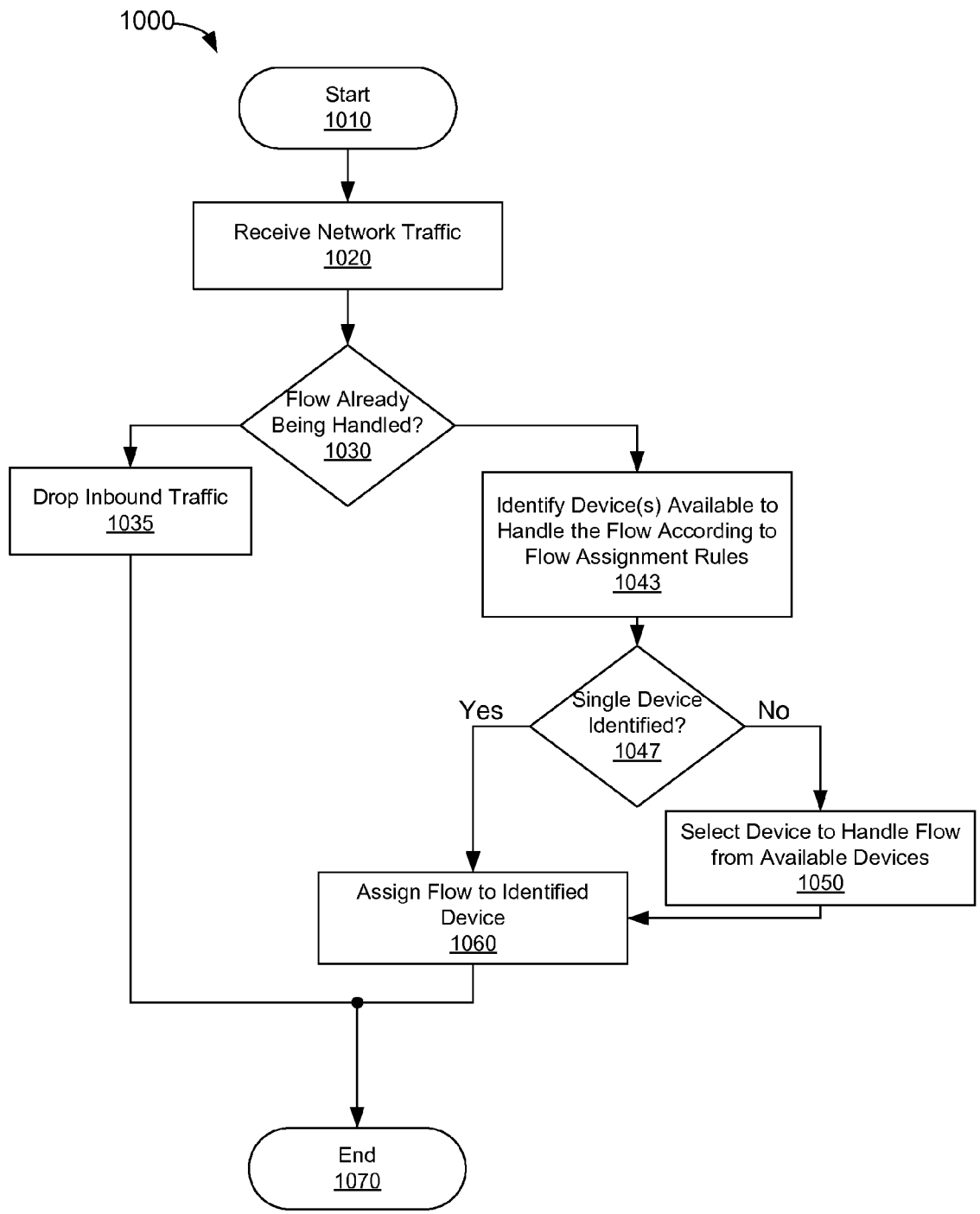
FIG. 10 is a flow diagram of another embodiment of a method for assigning network flows to cluster devices.

FIG. 10 is a flow diagram of another embodiment of a method for assigning flows to cluster devices. The method 1000 may be implemented on a computing device, such as the device 410 of FIG. 4. The method 1000 may be implemented using one or more computer-readable and/or computer-executable instructions. The instructions comprising the method 1000 may be implemented as one or more distinct software modules, which may be stored on a computer-readable storage medium, such as a hard disc, optical storage media, memory, or the like. In some embodiments, one or more steps of the method 1000 may be tied to particular machine components, such as computer-readable storage media, communications interfaces, processing modules, or the like.

At step 1010, the method 1000 may start and/or be initialized. Initializing the method 1000 may comprise loading one or more computer-readable instructions from one or more computer-readable storage media, accessing and/or initializing one or more communications interfaces, and the like.

At step 1020, network traffic may be received. The network traffic may have been received via a network interface (e.g., interface 120 and/or 122 of FIG. 1), such as a hub, switch, router, concentrator, or the like. If the cluster of method 1000 is operating in "flooding" mode, the inbound traffic may be received by all of the devices in the cluster. If the cluster is operating in "direct forwarding" mode, the traffic may be received only by the cluster master device (or the device currently assigned to handle the flow).

At step 1030, the cluster master may determine whether the network traffic is associated with a known flow (e.g., a flow that is being handled by one of the devices in the cluster). Step 1030 may comprise looking up the flow in a flow assignment data structure, such as a table, index, or the like. The flow assignment data structure may provide a mapping between network flows and the cluster devices assigned thereto. In the data structure, a flow may be identified based upon a source address thereof (IP address, MAC address, or the like), flow protocol, flow port, flow security information, or the like. The cluster device assigned to the flow may be identified according to a cluster-specific identifier, MAC address, cluster address (e.g., address of a cluster interface port of the device), IP address, or the like. In some embodiments, the flow assignment data structure may further comprise flow, run-time synchronization data pertaining to the flow, which may include, but is not limited to: flow security association data (P1SA, P2SA), shared key data, user-session data, flow cache, and the like. Alternatively, or in addition, the flow assignment data structure may include a reference (link, pointer, or the like) to the flow, run-time synchronization data associated therewith.

If at step 1030, the method 1000 determines that there is no device assigned to handle the flow (e.g., there is no entry for the flow in the flow assignment data structure, the device identifier associated with the flow entry has not been set, the device that was handling the flow has been failed over, or the like), the method 1000 may continue at step 1040; otherwise, if a device is already actively handling the flow, the method 1000 may continue at step 1035.

At step 1035, since the network traffic is associated with a flow that has already been assigned to cluster device that is actively handling the flow (e.g., has not failed), the traffic may be ignored by the method 1000. Accordingly, the method 1000 may terminate at step 1070 and/or may continue at step 1020 when additional network traffic is received.

At step 1043, one or more device(s) that are available to handle the flow may be identified. The devices may be identified according to a set of one or more flow assignment rules. The flow assignment rules applied at step 1043 may include, but are not limited to: related flow assignment rules, and security flow assignment rules.

Related flow assignment rules may specify that flows that are related to one another be assigned to the same cluster device. The assignment of related flows to the same device may provide for more efficient flow processing, provide for better firewall management (e.g., pin-hole logic for inbound flow processing), and so on. For example, a related flow assignment rule may specify that all the flows associated with a tunnel switch connection (discussed above) be assigned to the same device. The assignment may prevent tunnel switch traffic from being transmitted between cluster devices, which may improve the performance of the tunnel switch (and the cluster generally). Other examples of related flow assignment rules include, but are not limited to: rules to assign forward and reverse flows to the same cluster device (which may provide for improved TCP reset protection), rules to assign related flows to the same device (e.g., flows associated with the same FTP, VOIP, or similar connection), and the like. For example, the data and control flows of the same FTP connection may be assigned to the same device, which may provide for more efficient and secure network traffic and flow processing (e.g., protocol inspection logic that opens the data channel pin-hole may be more efficient and secure when implemented on the device that is also processing the FTP connection control channel flows).

Security flow assignment rules may perform flow assignment based upon flow security properties. For example, a security flow assignment rule may cause flows that use the same secure tunnel (e.g., SSH or the like) to be assigned to the same cluster device. As discussed above, the assignment may allow for PS2A sequence number synchronism between flows to prevent replay attacks and/or to provide for DPD. In another example, a security flow assignment rule may specify that flows using a common security association (inbound and/or outbound security association) be assigned to the same device. In embodiments implementing a single IKE, security flow assignment rules may allow for load balancing on a per-tunnel basis (e.g., allow flows from the same peer, but using different secure tunnels, to be handled by different cluster devices). In other embodiments, in which each device implements its own IKE, a security flow assignment rule may specify that all secure flows associated with a particular peer be assigned to the same cluster device.

After applying the flow assignment rules, the method 1000 may continue to step 1047. At step 1047, if (according to the flow assignment rules applied at step 1043) only a single device is available to handle the new flow, the method 1000 may continue at step 1060; otherwise, the method 1000 may continue at step 1050.

At step 1050, one of the two or more available cluster devices identified at step 1043 may be selected to handle the flow. As discussed above, the selection may be based upon a selection criteria, such as device health score, processing load, random selection, round robin, or the like. After selection of the device to handle the new flow, the method 1000 may continue at step 1060.

At step 1060, the new flow may be assigned to the identified cluster device. Assigning the flow may include, but is not limited to: configuring the identified cluster device to handle network traffic associated with the flow (e.g., via a configuration message transmitted thereto via a cluster communications port or the like), updating a flow assignment data structure to reflect the flow assignment, configuring a network element to direct-forward network traffic related to the flow to the identified device, and the like.

At step 1070, the method 1000 may end until additional inbound network traffic is received.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the disclosure.

We claim:

1. A non-transitory computer-readable storage medium comprising instructions to cause a computing device to perform a method, the method comprising:
maintaining a flow assignment data structure comprising mappings between network flows and cluster computing devices assigned thereto by a cluster master, wherein each of the cluster computing devices is coupled to an external network interface and is capable of processing network flows independently of the cluster master;
identifying a network flow for processing by the cluster;
assigning the network flow to a selected one of the cluster computing devices;
aggregating, at the cluster master, flow session data received from two or more of the cluster computing devices, wherein the flow session data comprises session keys of network flows assigned to the two or more cluster computing devices, each network flow being established between a respective one of the two or more cluster computing devices and an external client; and
configuring the assigned cluster computing device to process network traffic associated with the network flow.

2. The computer-readable storage medium of claim 1, wherein processing network traffic comprises subjecting network traffic associated with the flow to a security policy.

3. The computer-readable storage medium of claim 1, further comprising configuring an inbound network interface communicatively coupling the cluster computing devices to a network to forward network traffic associated with the network flow to the assigned cluster computing device.

4. The computer-readable storage medium of claim 1, wherein the network flow is assigned to a cluster computing device according to one or more flow assignment rules.

5. The computer-readable storage medium of claim 4, wherein one of the one or more flow assignment rules specifies that related network flows are to be assigned to the same cluster computing device.

6. The computer-readable storage medium of claim 4, wherein one of the one or more flow assignment rules specifies that related forward and reverse network flows are to be assigned to the same cluster computing device.

7. The computer-readable storage medium of claim 4, wherein one of the one or more flow assignment rules specifies that flows relating to the same protocol connection are to be assigned to the same cluster computing device.

8. The computer-readable storage medium of claim 7, wherein one of the one or more flow assignment rules specifies that file transfer protocol (FTP) control network flows are to be assigned to the same cluster computing device that is handling related FTP data network flows and vice versa.

9. The computer-readable storage medium of claim 4, wherein one of the one or more flow assignment rules specifies that flows associated with the same tunnel are to be assigned to the same cluster computing device.

10. The computer-readable storage medium of claim 4, wherein one of the one or more flow assignment rules specifies that flows associated with the same tunnel switch are to be assigned to the same cluster computing device.

11. The computer-readable storage medium of claim 4, wherein one of the one or more flow assignment rules specifies that network flows sharing the same security information are to be assigned to the same cluster computing device.

12. The computer-readable storage medium of claim 4, wherein one of the one or more flow assignment rules specifies that network flows sharing the same security association are to be assigned to the same cluster computing device.

13. The computer-readable storage medium of claim 12, wherein the flow assignment rule specifies that network flows sharing the same inbound security association are to be assigned to the same cluster computing device, and that network flows sharing the same outbound security association are to be assigned to the same cluster computing device.

14. The computer-readable storage medium of claim 4, wherein one of the one or more flow assignment rules specifies that all Internet Protocol Security (IPSec) flows associated with a particular peer are to be assigned to the same cluster computing device.

15. The computer-readable storage medium of claim 4, wherein one of the one or more flow assignment rules specifies that flows associated with the same secure tunnel are to be assigned to the same cluster computing device.

16. A system comprising:
a cluster comprising a plurality of communicatively coupled computing devices, wherein one of the cluster computing devices is configured to operate as a cluster master, and wherein each of the cluster computing devices is coupled to an external network interface and is capable of processing network flows independently of the cluster master; and
a network interface communicatively coupling the cluster to an external network; a flow assignment module implemented on the cluster master computing device and configured to assign network flows to the cluster computing devices according to one or more flow assignment rules,
wherein the cluster computing devices are configured to receive inbound network traffic via the network interface, and wherein each of the cluster computing devices comprises a traffic processing module configured to ignore inbound network traffic that is not associated with a network flow assigned thereto, and to process inbound network traffic related to network flows that are assigned to the cluster computing device according to a security policy,
wherein the cluster master is configured to aggregate flow session data received from two or more of the cluster computing devices, and wherein the flow session data comprises cache data of network flows with respective clients in an external network assigned to the two or more cluster computing devices, and
wherein assigning the network flow to a selected cluster computing device comprises configuring a flow processing module of the selected cluster computing device to identify and process network traffic associated with the assigned network flow.

17. The system of claim 16, wherein responsive to receiving inbound network traffic from the external network, the flow assignment module is configured to determine whether a cluster computing device has been assigned to a network flow corresponding to the inbound network traffic, wherein if no cluster computing device is assigned to the corresponding network flow, the flow assignment module is configured to assign the flow to one of the cluster computing devices according to the one or more flow assignment rules, and wherein if a cluster computing device has been assigned to the corresponding network flow, the flow assignment module ignores the inbound network traffic.

18. The system of claim 17, wherein assigning the network flow to a cluster computing device comprises updating a flow assignment data structure to associate the network flow with one of the cluster computing devices.

19. The system of claim 16, wherein assigning the network flow to a selected cluster computing device comprises transmitting the inbound network traffic to the selected cluster computing device.

20. The system of claim 17, wherein assigning the network flow to a selected cluster computing device comprises configuring the network interface to forward network traffic associated with the network flow to the selected cluster computing device.

21. The system of claim 16, wherein the one or more flow assignment rules comprise flow assignment rules specifying that related forward and reverse network flows, flows related to the same tunnel, the same protocol connection, and/or the same tunnel switch are to be assigned to the same cluster computing device.

22. The system of claim 16, wherein the one or more flow assignment rules comprise flow assignment rules specifying that flows sharing the same security information are to be assigned to the same cluster computing device.

23. The system of claim 22, wherein one of the one or more flow assignment rules specifies that network flows associated with the same secure tunnel are to be assigned to the same cluster computing device.

24. The system of claim 22, wherein one of the one or more flow assignment rules specifies that secure network flows to the same external peer are to be assigned to the same cluster computing device.

25. The system of claim 22, wherein one of the one or more flow assignment rules specifies that network flows sharing the same security association are to be assigned to the same cluster computing device.

26. The system of claim 22, wherein one of the one or more flow assignment rules specifies that network flows sharing the same inbound security association are to be assigned to the same cluster computing device, and network flows sharing the same outbound security association are to be assigned to the same cluster computing device.

27. The system of claim 16, further comprising a shared Internet Key Exchange (IKE) module implemented on the cluster master computing device, wherein the cluster computing devices are configured to negotiate security associations using the shared IKE module.

28. A method for assigning network flows within a cluster comprising a plurality of computing devices, the method comprising:
maintaining a flow assignment data structure comprising mappings between network flows and computing devices assigned thereto by a cluster master, wherein each of the cluster computing devices is coupled to an external network interface and is capable of processing network flows independently of the cluster master;
receiving network traffic on a network interface, the network traffic corresponding to a network flow;
assigning the network flow to a selected one of the plurality of computing devices by:
identifying one or more computing devices that are eligible to be assigned the received network flow using the flow assignment data structure and one or more flow assignment rules,
selecting one of the one or more eligible computing devices according to a selection criteria, and
configuring the selected computing device to process network traffic associated with the received network flow; and
aggregating, at the cluster master, flow session data received from two or more of the cluster computing devices, wherein the flow session data comprises security association sequences of network flows between each of the two of more cluster computing devices and respective computing devices in an external network.

29. The method of claim 28, further comprising transmitting the received network traffic to the selected computing device.

30. The method of claim 29, further comprising configuring the network interface to forward network traffic corresponding to the network flow to the selected computing device.

31. The method of claim 29, wherein one of the one or more traffic assignment rules determines eligibility based upon whether one or more of the computing devices is assigned a network flow that is related to the received network flow.

32. The method of claim 29, wherein one of the one or more of the traffic assignment rules determines eligibility based upon whether one or more of the computing devices is assigned a network flow that shares security information with the received network flow.

33. The method of claim 32, wherein one of the one or more traffic assignment rules determines eligibility based upon whether one or more of the computing devices is assigned a network flow sharing a secure tunnel with the received network flow.

34. A method for processing network traffic by a computing device in a cluster comprising a plurality of computing devices, comprising:
receiving a network flow assignment to assign one or more network flows to the computing device from a cluster master, wherein the computing device is communicatively coupled to an external network interface and is capable of processing network flows independently of the cluster master;
receiving network traffic relating to a plurality of different network flows;
processing the received network traffic by:
identifying network traffic associated with network flows assigned to the computing device,
processing the identified network traffic according to a security policy, and dropping network traffic that is not identified as associated with a network flow assigned to the computing device; and
transmitting flow session data to a cluster master via a network interface, the flow session data comprising a session key of a network flow assigned to the computing device and comprising a network connection between the computing device and a client.

35. The method of claim 34, further comprising maintaining a flow assignment data structure identifying the one or more network flows assigned to the computing device.

36. The method of claim 35, wherein the flow assignment data structure identifies network flows using one selected from a source address of the assigned network flow, a destination address of the assigned network flow, a protocol of the assigned network flow, and a port assignment of the assigned network flow.

37. The method of claim 34, further comprising:
for each of the assigned network flows:
maintaining run-time synchronization data associated therewith, and synchronizing the run-time synchronization data to a cluster master computing device.

38. The method of claim 35, wherein processing the identified network traffic comprises negotiating a security association, the method further comprising accessing a shared Internet Key Exchange (IKE) service provided by one of the cluster computing devices to perform the security association negotiation.

39. A cluster computing device, comprising:
a communication interface communicatively coupled to an external network interface and a cluster interface; and
a traffic processing module operable on a processor of the cluster computing device and configured to receive a network flow assignment from a cluster master via the cluster interface, the network flow assignment identifying one or more network flows assigned to the cluster computing device,
wherein the traffic processing module is configured to receive network traffic associated with a plurality of different network flows on the external network interface independently of the cluster master, and wherein upon receiving the network traffic, the traffic processing module is configured to identify network traffic associated with the one or more network flows assigned to the cluster computing device, to process the identified network traffic according to a security policy, and to drop network traffic that is not identified as assigned to the cluster computing device, and
wherein the cluster computing device is configured to transmit flow session data to the cluster master on the cluster interface, the flow session data comprising cache data of a network flow assigned to the cluster computing device and pertaining to a network connection between the cluster computing device and a client computing device.

40. The cluster computing device of claim 39, wherein the cluster computing device is configured to maintain a flow assignment data structure identifying the one or more network flows assigned thereto, and wherein the traffic processing module identifies the network traffic assigned to the cluster computing device using the flow assignment data structure.

41. The cluster computing device of claim 40, wherein the flow assignment data structure identifies network flows assigned to the cluster computing device based upon one selected from a source address of the assigned network flow, a destination address of the assigned network flow, a protocol of the assigned network flow, and a port assignment of the assigned network flow.

42. The cluster computing device of claim 39, wherein the flow processing module is configured to maintain run-time synchronization data associated with each of the network flows assigned to the cluster computing device, and to synchronize the runtime synchronization data to a cluster master computing device via the cluster interface.

43. The cluster computing device of claim 39, wherein processing the identified network traffic comprises negotiating a security association, and wherein the flow processing module is configured to access a shared Internet Key Exchange (IKE) service provided by one of the cluster computing devices to perform the security association negotiation.

* * * * *